(12) United States Patent
Gendelman et al.

(10) Patent No.: US 8,434,563 B2
(45) Date of Patent: May 7, 2013

(54) DEVICE FOR CULTIVATING SOIL OR BRUSHING DEBRIS

(75) Inventors: Svetlana Gendelman, Holland, PA (US); John M. Gagas, Milwaukee, WI (US); Rick Huth, Pen Argyl, PA (US)

(73) Assignee: Schiller Grounds Care, Inc., Southampton, PA (US)

( * ) Notice: Subject to any disclaimer, the term of this patent is extended or adjusted under 35 U.S.C. 154(b) by 78 days.

(21) Appl. No.: 13/033,720

(22) Filed: Feb. 24, 2011

(65) Prior Publication Data

US 2011/0209886 A1 Sep. 1, 2011

Related U.S. Application Data

(60) Provisional application No. 61/308,475, filed on Feb. 26, 2010.

(51) Int. Cl.
*A01B 21/02* (2006.01)
(52) U.S. Cl.
USPC .......................................... 172/555; 172/107
(58) Field of Classification Search .................. 172/555, 172/540, 556, 604, 349, 123, 41, 42, 112, 172/107
See application file for complete search history.

(56) References Cited

U.S. PATENT DOCUMENTS

| | | |
|---|---|---|
| 60,482 A | 12/1866 | Crockett |
| 337,212 A | 3/1886 | Van Dusen |
| 1,087,092 A | 2/1914 | Stingle |
| 1,119,807 A | 12/1914 | Carter |
| 1,409,319 A | 3/1922 | Vaughan |
| 1,914,257 A | 6/1933 | Holmes |
| 2,258,861 A | 10/1941 | Park |
| D130,756 S | 12/1941 | Howard |
| D137,738 S | 4/1944 | Bradley |
| 2,491,860 A | 12/1949 | Ingraham |
| 2,558,180 A | 6/1951 | Johnson |
| 2,691,928 A | 10/1954 | Kelsey |
| 2,777,374 A | 1/1957 | Kinsey |
| 2,836,073 A | 5/1958 | Masters |
| 3,016,957 A | 1/1962 | Olson |
| 3,040,590 A | 6/1962 | Smithburn |
| 3,123,149 A | 3/1964 | White |
| 3,128,831 A * | 4/1964 | Arndt ............................ 172/123 |
| D199,019 S | 8/1964 | Marson |
| 3,196,752 A | 7/1965 | Wahlstrom |
| 3,202,004 A | 8/1965 | Field |
| 3,232,146 A | 2/1966 | Behn |
| 3,523,411 A | 8/1970 | Eberly |

(Continued)

*Primary Examiner* — Árpád Fábián-Kovács
(74) *Attorney, Agent, or Firm* — Panitch Schwarze Belisario & Nadel LLP

(57) ABSTRACT

A device for cultivating soil or brushing debris includes a frame supporting a transmission, a motor, and a shaft rotatably supported by a transmission housing and driven by the motor through the transmission. A distal end of the shaft includes a passageway therethrough. A fastener is at least partially received within the passageway. A tine assembly may be removably attached to the shaft and includes a first pair of two laterally spaced-apart tine disks. The first pair of tine disks being laterally positioned on the shaft between the fastener and the housing. A brush attachment may be removably attached, and includes a tube, which has a wheel rotatably attached to a first end thereof and a first gear fixedly attached to an opposing second end thereof. At least a portion of the fastener extends through at least a portion of the tube to fixedly attach the tube to the shaft.

13 Claims, 20 Drawing Sheets

U.S. PATENT DOCUMENTS

| | | |
|---|---|---|
| 4,016,948 A | 4/1977 | Kuester |
| 4,026,163 A | 5/1977 | Merkert |
| 4,043,399 A | 8/1977 | Morrison |
| 4,062,408 A | 12/1977 | Enters et al. |
| 4,091,685 A | 5/1978 | Shingaki et al. |
| 4,103,566 A | 8/1978 | Von Kaler et al. |
| 4,122,902 A | 10/1978 | Alexander |
| 4,133,389 A | 1/1979 | Ruhl et al. |
| D254,156 S | 2/1980 | Swartz et al. |
| 4,191,259 A | 3/1980 | Boren |
| 4,214,632 A | 7/1980 | Brookshier |
| 4,237,632 A | 12/1980 | Segerstad |
| 4,244,427 A | 1/1981 | Enters et al. |
| 4,263,903 A | 4/1981 | Griggs |
| 4,282,767 A | 8/1981 | Guichard |
| 4,286,670 A | 9/1981 | Ackerman |
| 4,286,671 A | 9/1981 | Mays |
| 4,294,027 A | 10/1981 | Edwards |
| 4,299,134 A | 11/1981 | Roy et al. |
| 4,304,019 A | 12/1981 | Sava |
| 4,321,969 A | 3/1982 | Wilson |
| 4,343,366 A | 8/1982 | Walker |
| 4,346,764 A | 8/1982 | Rossi |
| 4,372,397 A | 2/1983 | Goertzen et al. |
| 4,392,538 A | 7/1983 | Goertzen |
| 4,396,067 A | 8/1983 | Enters et al. |
| 4,398,135 A | 8/1983 | Busch et al. |
| 4,398,314 A | 8/1983 | Converse et al. |
| 4,398,606 A | 8/1983 | Herscher |
| 4,402,366 A | 9/1983 | Dankel |
| 4,412,464 A | 11/1983 | Cook |
| 4,418,731 A | 12/1983 | Smith et al. |
| 4,421,176 A * | 12/1983 | Tuggle et al. .................. 172/41 |
| 4,444,071 A | 4/1984 | Guichard |
| 4,492,271 A | 1/1985 | Doering |
| 4,519,459 A | 5/1985 | Reaume |
| 4,524,646 A | 6/1985 | Kimberlin, Jr. |
| 4,567,949 A | 2/1986 | Herscher |
| 4,591,001 A | 5/1986 | Barbee |
| D284,161 S | 6/1986 | DeLano |
| 4,611,504 A | 9/1986 | Rundle |
| 4,615,395 A | 10/1986 | Nagamine |
| 4,621,697 A | 11/1986 | Webb |
| 4,640,366 A | 2/1987 | Saito |
| 4,651,592 A | 3/1987 | Edwards |
| 4,658,910 A | 4/1987 | Garriss |
| 4,662,241 A | 5/1987 | Edwards |
| RE32,467 E | 8/1987 | Mays |
| 4,696,348 A | 9/1987 | Novoselsky |
| 4,699,219 A | 10/1987 | Durrant et al. |
| 4,706,761 A | 11/1987 | Herscher et al. |
| 4,713,983 A | 12/1987 | Rundle |
| 4,754,660 A | 7/1988 | Kobayashi et al. |
| 4,760,758 A | 8/1988 | Murayama |
| 4,776,405 A | 10/1988 | Grieder et al. |
| 4,802,536 A | 2/1989 | O'Neal |
| 4,805,704 A | 2/1989 | Kobashi et al. |
| 4,811,794 A | 3/1989 | Greene |
| 4,838,357 A | 6/1989 | Adachi et al. |
| 4,844,175 A | 7/1989 | Nations |
| 4,905,543 A | 3/1990 | Choi |
| 4,942,655 A | 7/1990 | Buzzelli |
| 4,967,849 A | 11/1990 | Kincaid |
| D319,822 S | 9/1991 | Troke |
| 5,048,616 A | 9/1991 | Hoff |
| 5,048,617 A | 9/1991 | Haven |
| 5,095,996 A | 3/1992 | Sprinkle |
| 5,145,467 A | 9/1992 | Periou et al. |
| 5,146,997 A | 9/1992 | Korin |
| 5,172,769 A | 12/1992 | Lunsford, Jr. |
| 5,197,551 A | 3/1993 | Farley |
| 5,207,126 A | 5/1993 | Schaben |
| 5,224,552 A | 7/1993 | Lee et al. |
| 5,226,639 A | 7/1993 | Kida et al. |
| 5,251,428 A | 10/1993 | Gay |
| 5,263,303 A | 11/1993 | Stroud |
| 5,277,083 A | 1/1994 | Madonia |
| 5,299,647 A | 4/1994 | Mudd et al. |
| 5,320,451 A | 6/1994 | Garvey et al. |
| 5,353,881 A | 10/1994 | Lee et al. |
| 5,370,293 A | 12/1994 | Bevins |
| 5,511,624 A | 4/1996 | Dunn |
| 5,520,253 A | 5/1996 | Kesting |
| 5,557,832 A | 9/1996 | Vanden Brook |
| 5,562,166 A | 10/1996 | Griffin |
| 5,570,606 A | 11/1996 | Irie |
| 5,573,069 A | 11/1996 | Shipley |
| 5,588,382 A | 12/1996 | Embree et al. |
| 5,632,345 A | 5/1997 | Stahl |
| 5,665,025 A | 9/1997 | Katoh |
| 5,713,420 A | 2/1998 | Roberts et al. |
| 5,850,882 A * | 12/1998 | Link .............................. 172/41 |
| 5,875,681 A | 3/1999 | Gerrand et al. |
| 5,896,931 A | 4/1999 | Roberts et al. |
| 5,908,075 A | 6/1999 | Iannello |
| D417,458 S | 12/1999 | Waibel |
| 6,050,344 A | 4/2000 | Larson et al. |
| 6,092,608 A | 7/2000 | Leger |
| 6,149,475 A | 11/2000 | Tasaka et al. |
| 6,189,627 B1 | 2/2001 | Marshall et al. |
| 6,257,080 B1 | 7/2001 | Shin |
| 6,264,516 B1 | 7/2001 | McEathron et al. |
| 6,338,209 B1 | 1/2002 | McClure |
| 6,340,061 B2 | 1/2002 | Marshall et al. |
| 6,367,561 B1 | 4/2002 | Firdaus |
| 6,454,031 B2 | 9/2002 | Szymkowiak |
| 6,467,550 B1 | 10/2002 | Firdaus |
| 6,470,766 B2 | 10/2002 | Ohta et al. |
| 6,516,542 B2 | 2/2003 | McClure |
| 6,523,618 B2 | 2/2003 | Firdaus |
| 6,622,466 B1 | 9/2003 | Ethier |
| 6,643,959 B2 | 11/2003 | Jolliff et al. |
| 6,644,002 B2 | 11/2003 | Trefz |
| 6,644,416 B2 | 11/2003 | Teeple |
| 6,651,752 B2 | 11/2003 | Sasaoka |
| 6,684,960 B1 | 2/2004 | Ng et al. |
| 6,688,094 B2 * | 2/2004 | Berndt et al. .................. 56/249 |
| 6,722,444 B2 | 4/2004 | McKill |
| 6,722,445 B2 | 4/2004 | Ohta et al. |
| 6,739,403 B2 | 5/2004 | Firdaus |
| 6,742,600 B2 | 6/2004 | Hoelscher |
| 6,766,866 B2 | 7/2004 | Miyahara et al. |
| 6,779,611 B2 | 8/2004 | Sugimoto et al. |
| 6,801,736 B2 | 10/2004 | Senda |
| 6,854,526 B2 | 2/2005 | Yamazaki et al. |
| 6,904,976 B1 | 6/2005 | Zach et al. |
| 6,904,977 B2 * | 6/2005 | Zerrer et al. .................. 172/42 |
| 6,926,091 B2 | 8/2005 | Lee |
| 6,945,333 B1 | 9/2005 | Drost et al. |
| 6,955,102 B2 | 10/2005 | Kanbara et al. |
| D539,105 S | 3/2007 | Bennett |
| 7,237,620 B2 | 7/2007 | Abenroth et al. |
| 7,257,909 B2 | 8/2007 | Shaffer et al. |
| D558,542 S | 1/2008 | Kiely |
| 7,363,837 B1 | 4/2008 | Odell |
| D589,313 S | 3/2009 | Engelke |
| 7,506,832 B2 | 3/2009 | Mori |
| 2007/0056406 A1 | 3/2007 | Klein |
| 2009/0008614 A1 | 1/2009 | Adams et al. |
| 2010/0064556 A1 | 3/2010 | Lau |

\* cited by examiner

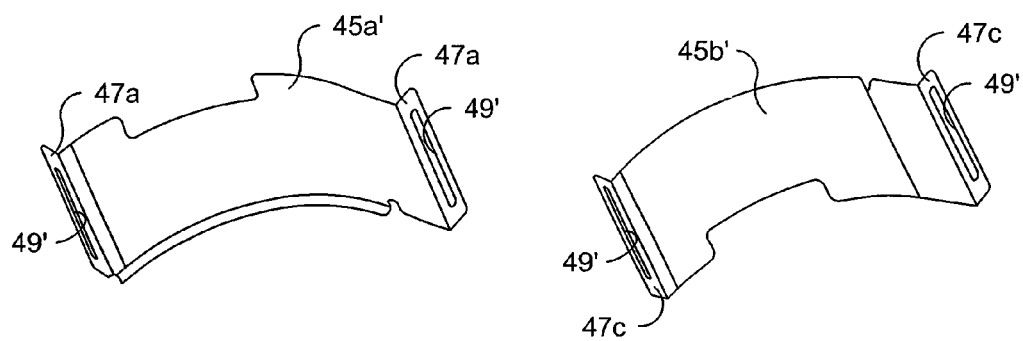
*Fig. 6*          *Fig. 6A*
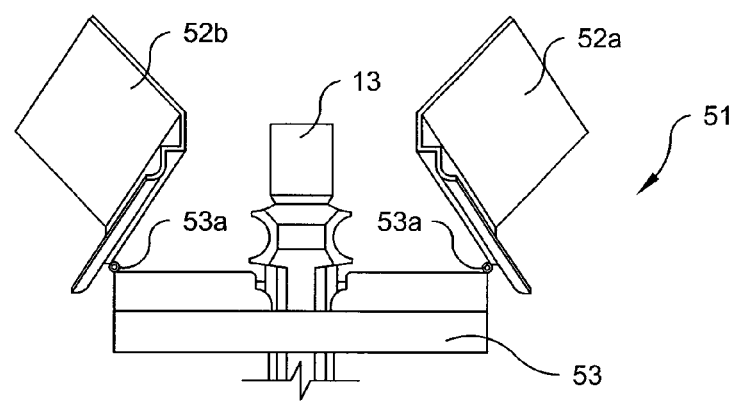
*Fig. 7*

DEVICE FOR CULTIVATING SOIL OR BRUSHING DEBRIS

CROSS-REFERENCE TO RELATED APPLICATIONS

The present application claims the benefit of U.S. Provisional Patent Application No. 61/308,475, filed Feb. 26, 2010 and entitled "Convertible Tiller with Split Tines," the entire subject matter of which is hereby incorporated by reference.

BACKGROUND OF THE INVENTION

The present invention is directed generally to a device for cultivating soil or brushing debris and, more particularly, to a tiller, cultivator or brushing apparatus that is selectively reconfigurable to include, for example, additional or fewer tines, a larger or smaller tine shield, or a brush attachment, and to a tiller, cultivator or brushing apparatus that is selectively reversible.

Manually operated tillers or cultivators, which are generally manufactured in three sizes, including large, mid-size and small or "mini," are well known. Large tillers, which are the walk-behind-type and/or motor driven, are heavy and bulky. As a result, large tillers can be difficult to maneuver or transport and store. Mid-size tillers are also walk-behind-units that are self-propelled, have large horse power (Hp) engines, are relatively heavy and are not meant for a single person to lift into or transport in a car, for example. Due to their size and weight, mid-size tillers are used for relatively large-scale tilling, such as in gardens, flower beds or in other locations where large areas need cultivating. While walk-behind-type tillers, such as the large and mid-size models, have been available with drive controls or transmissions that permit selective disengagement of power to the tines, such drive controls are complicated and require levers for changing operation.

Mini tillers are compact, generally less than ten inches wide, light-weight (often around twenty-two pounds) and capable of being easily transported in a car, for example. Mini tillers are easier to maneuver due to their light-weight and relatively small width, and are also easier to store. With a mini tiller, the operating controls are simple and easy to use and understand. Mini tillers generally include an engine, such as a 2-cycle gas, 4-cycle gas or electric motor, tines that dig into the ground to penetrate and pulverize the soil, and a gear train housing assembly, sometimes called the "transmission," which has a housing enclosing gears that drive a tine shaft attached to the tines. Typically, mini tillers include a handle to allow a user to guide or maneuver the unit. A shield may cover the tines and prevent debris from being thrown toward the user, for example.

Typically, large and mid-size operated tillers are driven in the same direction as the rotary movement of the tines, such that the tine rotation tends to assist in moving the unit forward. However, the normal operation of a mini tiller is by pulling against the rotation of the tines. That is, the tines rotate in a forward direction, but proper operation of the tiller includes pulling the tiller back toward the operator, in the direction opposite in which the tiller would tend to travel due to the rotation of the tines. Thus, for small tillers, the method of tilling is by pulling the unit in the opposite direction of the tine rotation, such that while the tines are moving forward and away from the operator, the tiller is pulled toward the operator.

There are several desirable structural and operational features that conventional mini-tillers lack. For example, conventional mini-tillers do not allow a user to selectively change the width of the tiller. Further, conventional mini-tillers do not offer the user the ability to perform larger tilling tasks and then covert the tiller to a smaller size to perform smaller tilling tasks, or vice-versa. Instead, the user must purchase multiple tillers of varying size or width to accomplish tilling tasks of varying size. The ability to till or cultivate the ground using a mini tiller on a relatively large area would take considerable time. However, if an individual buys a large tiller, it cannot be used to go between the rows of plants for weeding, for example, and it would be difficult to transport the large tiller to other locations. Currently, the individual would have to purchase both a large tiller and a small tiller to complete both jobs. Thus, in today's tiller market, there is a gap with no one product to accomplish the job of both mini and larger tillers.

Further, the ability to reverse or change the rotational direction of the tines is not currently possible on mini tillers. Conventional reversing mechanism are not able to be supported or included in conventional mini tillers due to their large size, complex mechanisms, and relatively high weight. Thus, it is currently difficult to change the direction of rotation of the tines on mini tillers due to the limits of size, weight, costs, and requirements for space on mini tillers. The ability to change the rotational direction of the tines is advantageous to allow a user to back-up the tiller in the event that an object is inadvertently run over or to add a particular attachment to the tiller. To effectuate the reverse feature on large and mid-size tillers, the operator is required to stop the tiller, reach down and move a lever. In effect, the operator is inserting/replacing one gear or gear group for another in the gear train, which, in turn, reverses the direction of the rotating gear and results in reversal of the rotational direction of the tine(s).

Those skilled in the art can appreciate the complicated mechanical requirements of redirecting the rotation through a different gear train by insertion. For example, slippage of the gears can occur if they are not properly engaged or aligned. Further, if the engagement is not done properly and the operator starts the tiller, grinding of the gear teeth can occur. Other times, the operator may start to use the tiller in the reverse direction only to have the lever "pop" back into the other direction (i.e., forward). Also, dirt or other foreign objects may fall into a slot that surrounds the lever, which can cause the gears to disengage, for example. Thus, improper operation of the tiller may be the result of any one of a number of reasons.

Therefore, there exists a need for a state-of-the-art compact tiller or cultivator that accurately controls engine speed, reduces noise, can selectively be increased or reduced in size, adds little weight, does not increase drag, and is easy to assemble. There exists a need for a smaller size tiller, cultivator or brushing apparatus to be able to convert to a larger size tiller, cultivator or brushing apparatus for larger projects. There is a need for a new innovative design that can be used in limited or confined spaces and fills the market gap between the mid-size and mini tiller. Further, it would be desirable to provide an accurate method of reversing a gear train of a tiller, cultivator or brushing apparatus without having to open holes, slots, or gaps within a portion of the tiller, cultivator or brushing apparatus. Thus, there exists a need for the user to be able to operate, adjust from forward to reverse, set and lock functions, and see results without leaving the operating position. The present invention fulfills the above-identified needs.

BRIEF SUMMARY OF THE INVENTION

Briefly stated, one aspect of a preferred embodiment of the present invention is directed to a device for cultivating soil or brushing debris including a frame supporting a transmission and a motor. The transmission defines a housing. A driveshaft, which is at least partially surrounded by the housing, is driven by the motor. The drive shaft is a worm having a first set of threads on an exterior surface thereof and a second set of threads on the exterior surface thereof The first set of threads are spaced-apart from and angled with respect to the second set of threads. A first gear, a second gear, and a third gear are all supported at least partially within the housing. External teeth of the second gear are in constant engagement with external teeth of both the first and third gears. A shaft is fixedly attached to the second gear and an assembly is removable attached to the shaft.

In another aspect, a preferred embodiment of the present invention is directed to a device for cultivating soil or brushing debris including a frame supporting a transmission and a motor. The transmission defines a housing. A shaft is rotatably supported by the housing and is driven by the motor through the transmission. A distal end of the shaft is spaced-apart from the housing and has a passageway therethrough. At least one fastener is sized and shaped to be at least partially received within the passageway of the shaft. One of a tine assembly and a tube is removable attached to the shaft. The tine assembly includes a first pair of two laterally spaced-apart tine disks. Each tine disk includes at least one blade for directly engaging and cultivating soil. The first pair of tine disks being laterally positioned on the shaft between the fastener and the housing. The tube includes a wheel rotatably attached to a first end thereof and a first gear fixedly attached to an opposing second end thereof. At least a portion of the at least one fastener extends through at least a portion of the tube to fixedly attach the tube to the shaft.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 6 is a top perspective view of a left extension of the shield shown in FIGS. 3-3C;

FIG. 6A is a top perspective view of a right extension of the shield shown in FIGS. 3-3C;

FIG. 7 is a front elevational view of a shield in accordance with a fourth preferred embodiment of the present invention;

DETAILED DESCRIPTION OF THE INVENTION

Figure 1:
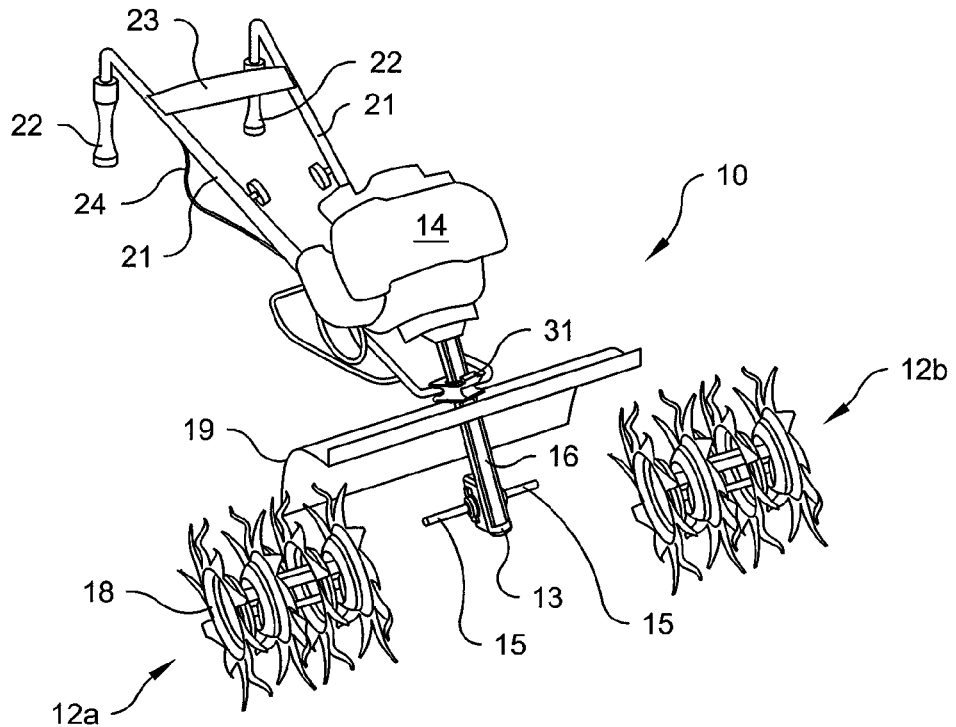
FIG. 1 is a front right-side perspective view of a tiller or cultivator in a partially disassembled configuration in accordance with a first preferred embodiment of the present invention.

Certain terminology is used in the following description for convenience only and is not limiting. The word "upper" designates a direction in the drawings to which reference is made. The words "inner" and "outer" refer to directions toward and away from, respectively, the geometric center of the device, and designated parts thereof, in accordance with the present invention. The words "right," "left," "front" and "rear" refer to directions in the drawings from the perspective of an individual or user holding handle bars of the device and facing toward the device (i.e., opposite from the perspective when viewing the figures). Unless specifically set forth herein, the terms "a," "an" and "the" are not limited to one element, but instead should be read as meaning "at least one." The terminology includes the above-listed words, derivatives thereof and words of similar import.

Referring to the drawings in detail, wherein like numerals indicate like elements throughout the several views, FIGS. 1-18B show a tiller, cultivator or brushing apparatus, generally designated 10 (referred to simply as "tiller"), and various parts, components, tools or attachments thereof in accordance with several preferred embodiments of the present invention. The tiller 10 is preferably capable of cultivating or turning-over soil, for example, or brushing or sweeping debris in at least two distinct configurations or sizes. The tiller 10 is also preferably capable of selectively accommodating or attaching to one or more tine assemblies 12a, 12b and one or more of a variety of attachments, such as a brush (FIG. 17) for dispersing snow, a broom, a paddle, or clippers. Although reference is made hereinafter to a "tiller 10," the present invention is not so limited. Specifically, the structural or operational features described herein may also be incorporated or employed in a cultivator, an edger, a bed redefiner, a planter or furrower, a plow, a lawn dethatcher, an aerator, a cleaner or sweeper, a hedge trimmer, or any other garden, lawn or hardtop maintenance apparatus, either commercial or personal/residential, for example.

Referring specifically to FIG. 1, the tiller 10 preferably includes a frame supporting a transmission or gear train assembly 13, described in detail below, operatively connected to a power unit 14, such as an electric or gas engine or motor. If electric, the power unit 14 may be an alternating current (AC) or direct current (DC) motor. A printed circuit board (PCB) (not shown) may be placed in, on or proximate to the power unit 14 to provide speed control thereto. In an embodiment employing an electric motor, an AC supply or a battery (not shown) preferably supplies the power or energy to the motor. In an embodiment in which the power supply is AC and the motor is DC, the PCB would preferably be capable of converting the AC to DC. Alternatively, if the power supply is DC from a battery and the motor is DC, the PCB would preferably control the speed by regulating voltage and current to the DC motor. Further, if the motor voltage and the battery voltage were not the same, the PCB would preferably step up (i.e., increase) or step down (i.e., decrease) the voltage in order to supply the proper voltage to the motor. In an embodiment employing a gas or diesel engine, a number of different power options are available. For a gas engine, the manufacturer can select a four stroke (cycle) or a two stroke (cycle) engine, for example.

As seen in FIGS. 1, 3C, 4, 8, 8A, 9, 9A, 9D, 11A, 12-13 and 14, a shaft or tine shaft 15 preferably extends outwardly from opposing side walls of a housing 16 defined by the transmission 13. The tine shaft 15 is at least partially surrounded by the housing 16 and is preferably rotatably supported by one or more bearings (not shown) of the transmission 13, such that the tine shaft 15 is rotatable with respect to the transmission 13 and/or housing 16. As understood by those skilled in the art, the transmission 13 operatively connects the tine shaft 15 to the power unit 14, such that operation of the power unit 14 rotates the tine shaft 15. As shown in FIG. 3B, a longitudinal axis 16a of the housing 16 of the transmission 13 preferably extends generally, if not exactly, perpendicular to a longitudinal axis 15c of the tine shaft 15. Further, the longitudinal axis 15c of the tine shaft 15 preferably extends generally, if not exactly, parallel to a ground surface (not shown) during proper operation of the tiller 10. The tine shaft 15 may be a single, unitary shaft that extends through the housing 16, or the tine shaft 15 may be two separate or independent shafts that extend outwardly from the housing 16 of the transmission 13 in opposing directions (i.e., 180 degrees from each other). While reference is made herein after to the tine shaft 15, such description is not limiting to a single, unitary shaft, as the features of the tine shaft 15 described herein can be employed equally as well with two separate tine shafts.

Figure 3:
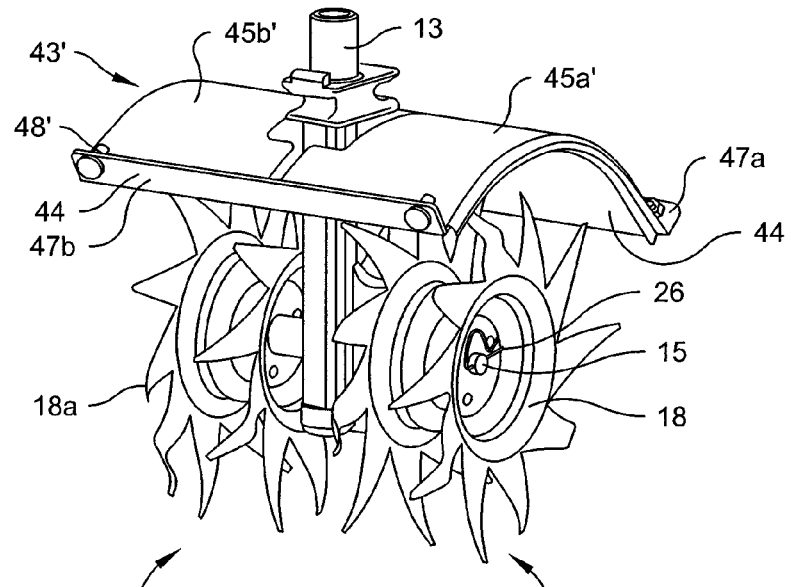
FIG. 3 is a front left-side perspective view of a base portion of a tiller or cultivator in accordance with a third preferred embodiment of the present invention, with a shield shown in a retracted configuration and tine extensions removed from the tiller or cultivator.
Figure 3A:
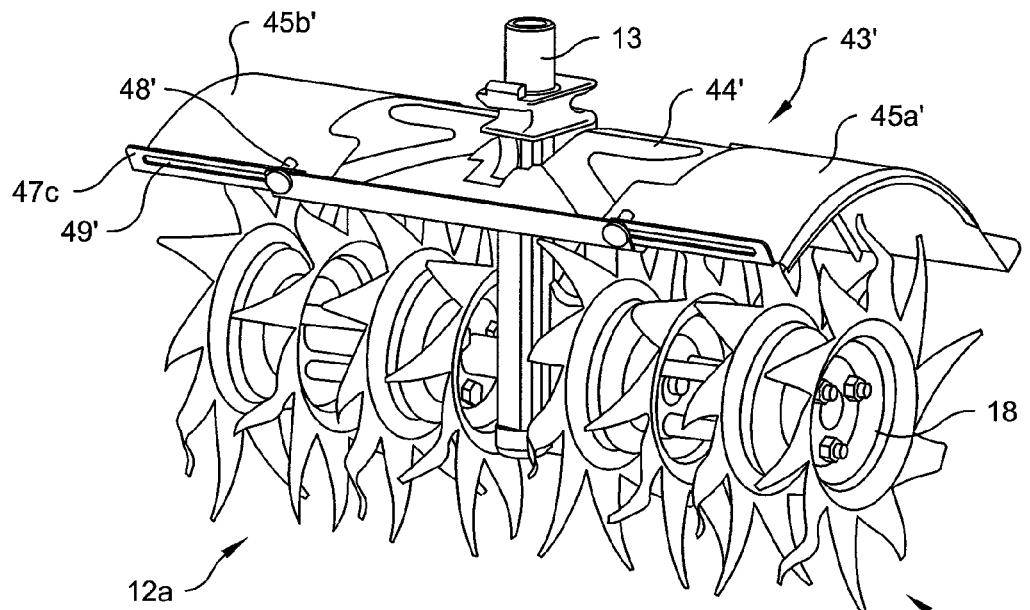
FIG. 3A is a front left-side perspective view of the base portion of the tiller or cultivator shown in FIG. 3, with the tine shield shown in an expanded configuration.
Figure 3B:
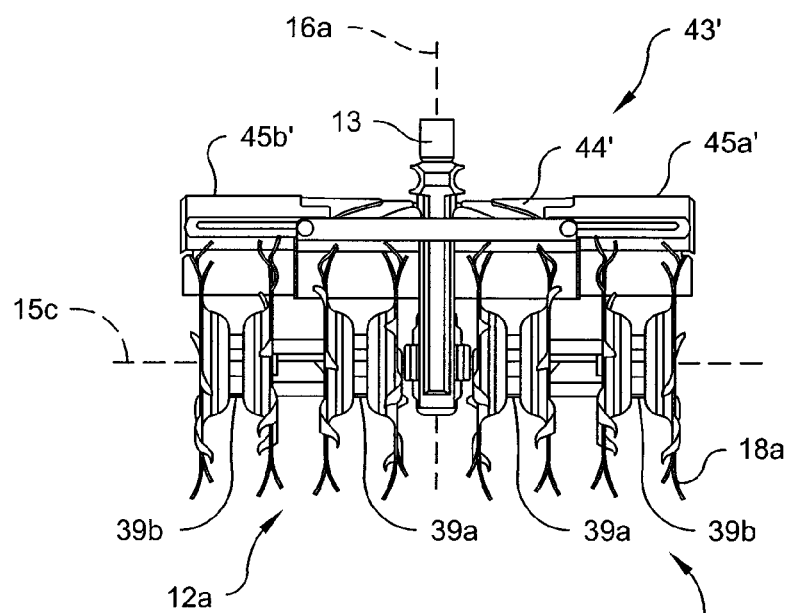
FIG. 3B is a front elevation view of the base portion of the tiller or cultivator shown in FIGS. 3A.
Figure 3C:
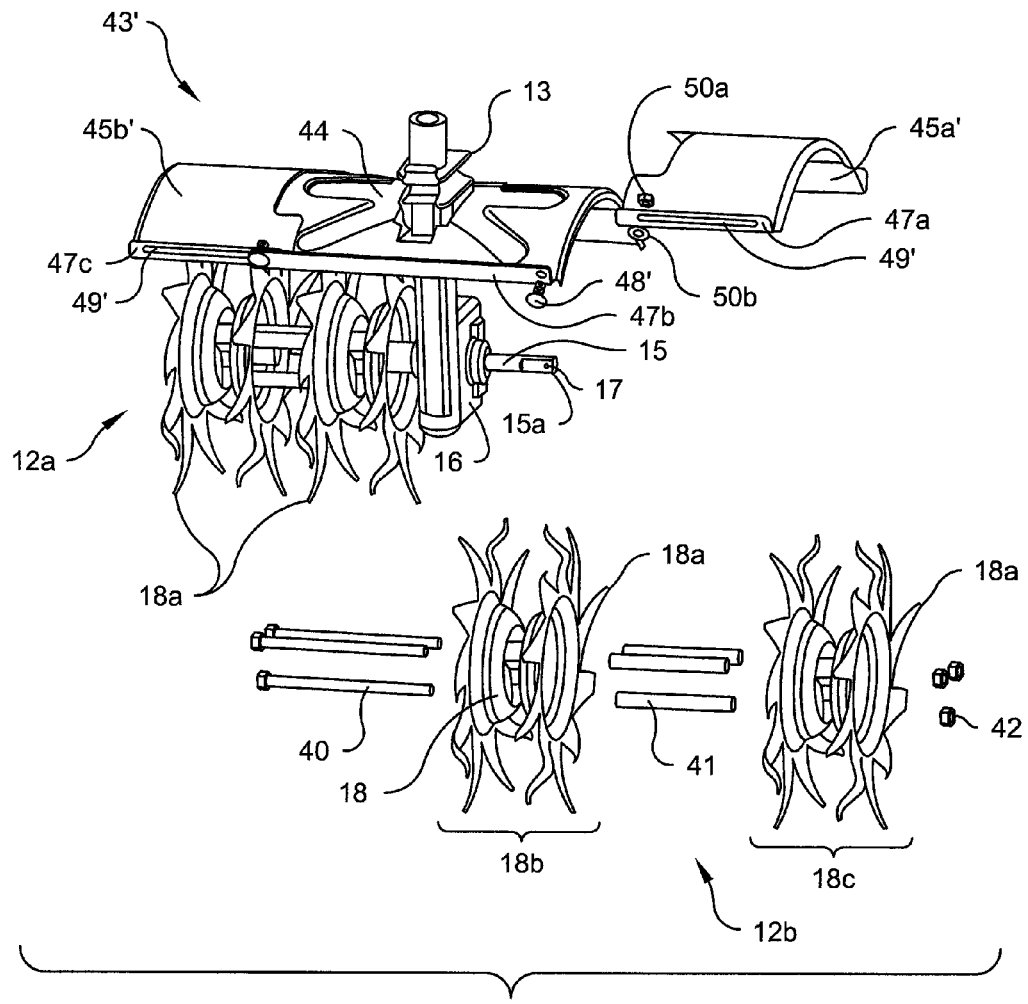
FIG. 3C is a partially exploded perspective view of the base portion of the tiller or cultivator shown in FIGS. 3A and 3B.
Figure 4:
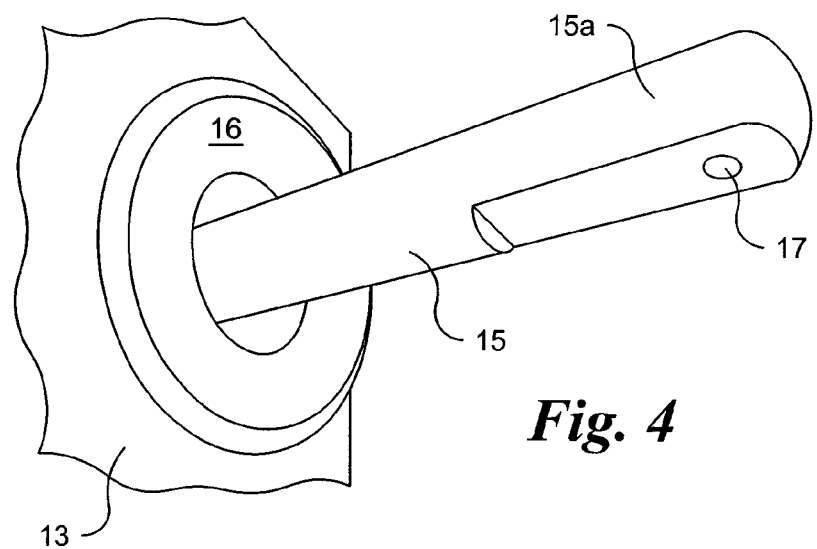
FIG. 4 is a greatly enlarged perspective view of one end of a shaft of the base portion of the tiller or cultivator shown in FIGS. 1-3C.
Figure 5:
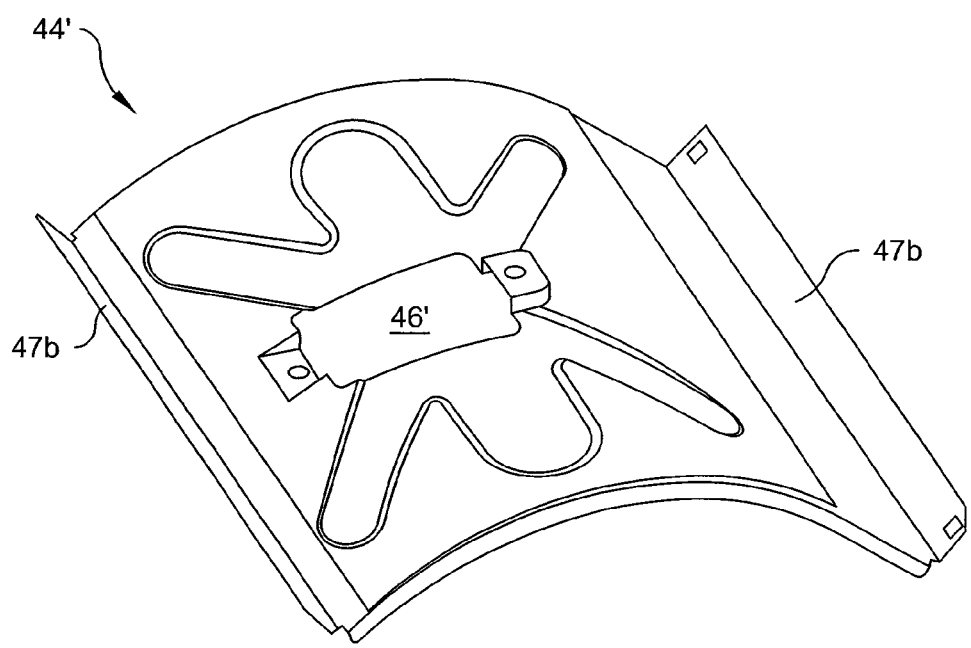
FIG. 5 is a greatly enlarged top perspective view of a center portion of the shield shown in FIGS. 3-3C.

As seen in FIGS. 3C and 4, a first distal end 15a of the tine shaft 15 preferably includes a passageway 17 that extends at least partially, if not completely, therethrough. The passageway 17 is preferably sized and shaped to receive at least a portion of a fastener 26 (see FIGS. 8 and 8A), such as a pin or clip, therethrough. Although the fastener 26 shown herein is a conventional cotter pin, the present invention is not so limited. It is preferred that at least a portion of the first end 15a of the tine shaft 15 has a reduced diameter or cross-sectional area or a flattened surface 15a, as compared to at least a remaining portion of the preferably generally cylindrical tine shaft 15. In the present embodiment, the outermost flattened surface of the first end 15a acts as a locking key. Further, the tine shaft 15 preferably includes an opposing second distal end 15b (FIGS. 9, 9A, 10, 10A, 11 and 11A) that is generally identical to the first end 15a.

Referring FIGS. 1-3C, an assembly or tine assemblies 12a, 12b are preferably selectively removably attached to each end 15a, 15b of the tine shaft 15. Each tine assembly 12a, 12b includes at least one and preferably two spaced-apart tine plates or disks 18 (see FIG. 3), or two pair of spaced-apart tine plates 18 (see FIGS. 1-2 and 3A-3C). Each tine plate 18 preferably includes one or more tines, blades or sharpened projections 18a that are sized and shaped to cut through, cultivate or till soil, for example. Each tine plate 18 preferably includes ten tines 18a projecting radially outwardly from a geometric center of the tine plate 18, but a greater or lesser number of tines 18a can be used. The tines 18a at an outer edge of the tine plate 18 can be rounded to reduce the power requirements needed to turn the blades and not be as aggressive as the pointed blade design. U.S. Pat. No. 5,299,647, which is assigned to Schiller-Pfeiffer, Inc. and herein incorporated by reference, describes a preferred embodiment of the tine plate.

Referring again to FIG. 1, the tiller 10 preferably includes the frame or a pair of tubes 21 that extend upwardly from the power unit 14 and the transmission 13 to form two spaced apart handles 22. A cross member 23 preferably extends between the two tubes 21. Opposing ends of the cross member 23 are preferably fixedly attached to each of the tubes 21. A cable 24 preferably extends from the power unit 14 to at least one of the handles 22 to allow the user to control operation of the power unit 14 and, thus, rotation of the tine plates 18 or a brush 36 (see FIG. 17), as described in detail below. A lever (not shown) is preferably operatively connected to the cable 24 and allows the operator to increase or decrease the speed of the power unit 14, for example. The tiller 10 preferably includes an interlock device (not shown) that prevents the operator from accidentally operating the tiller.

Figure 18:
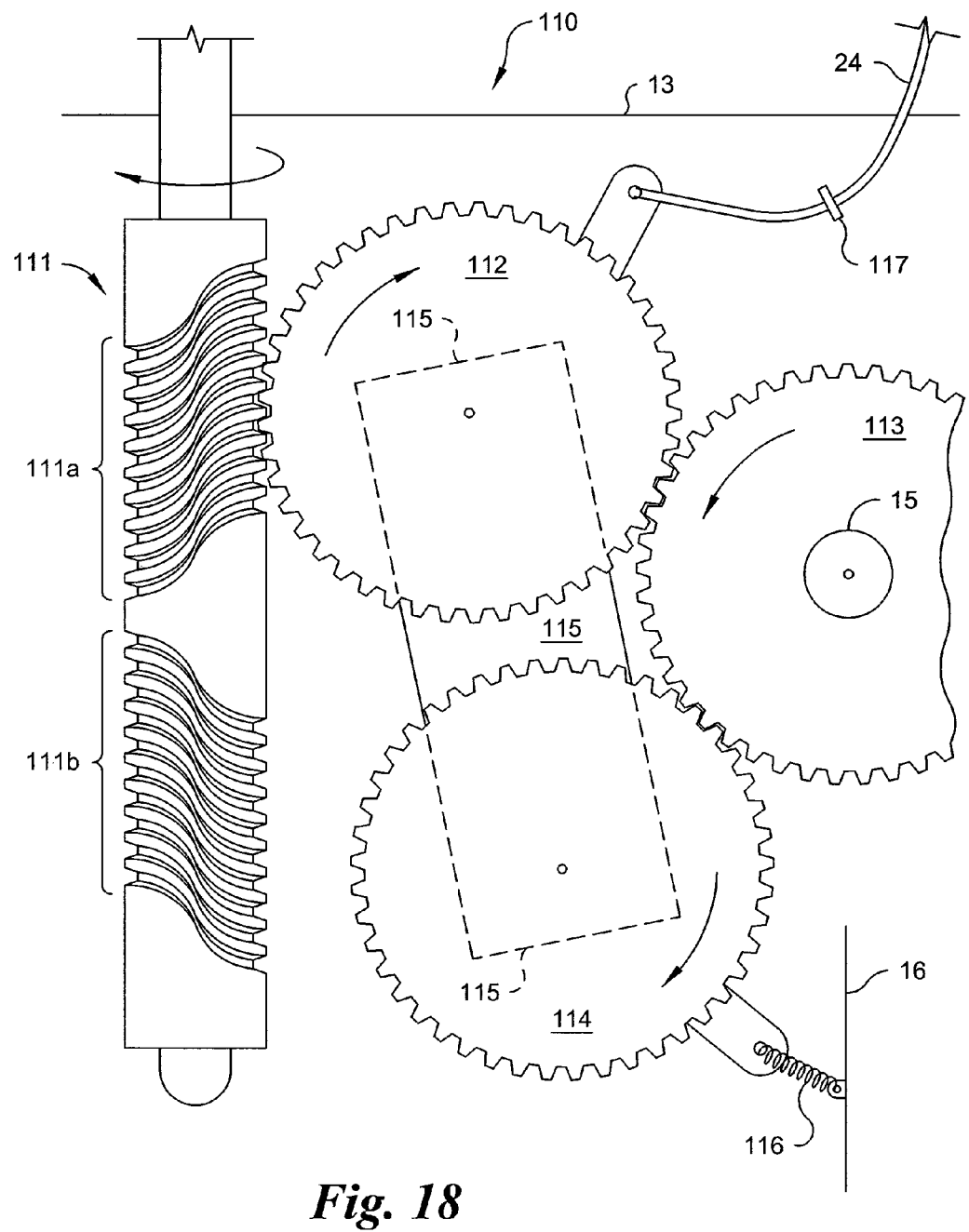
FIG. 18 is a schematic side elevation view of a reverse mechanism in accordance with a preferred embodiment of the present invention, with the reverse mechanism in a first or forward configuration.
Figure 18A:
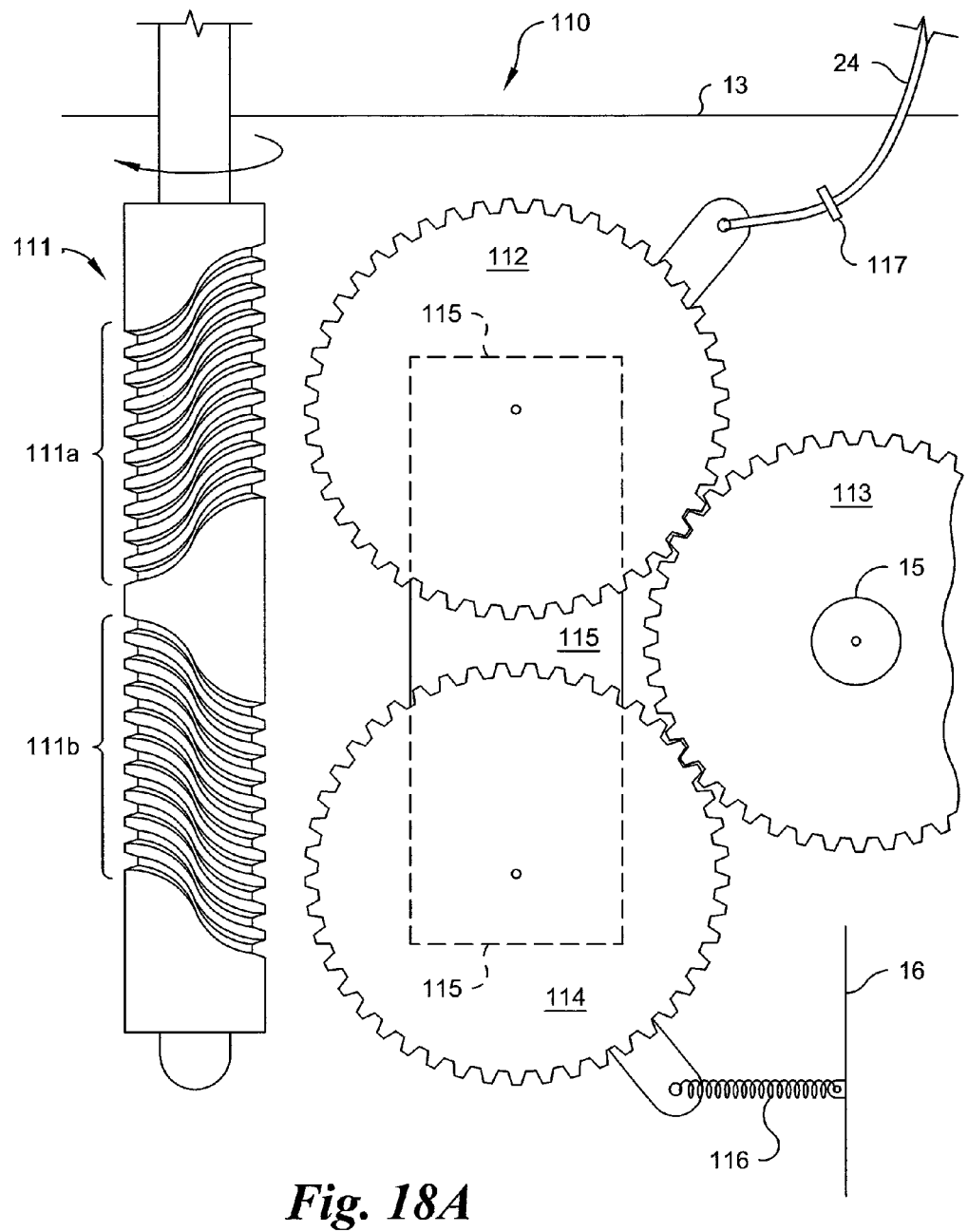
FIG. 18A is a schematic side elevation view of the reverse mechanism shown in FIG. 18, with the reverse mechanism in a second or neutral configuration.
Figure 18B:
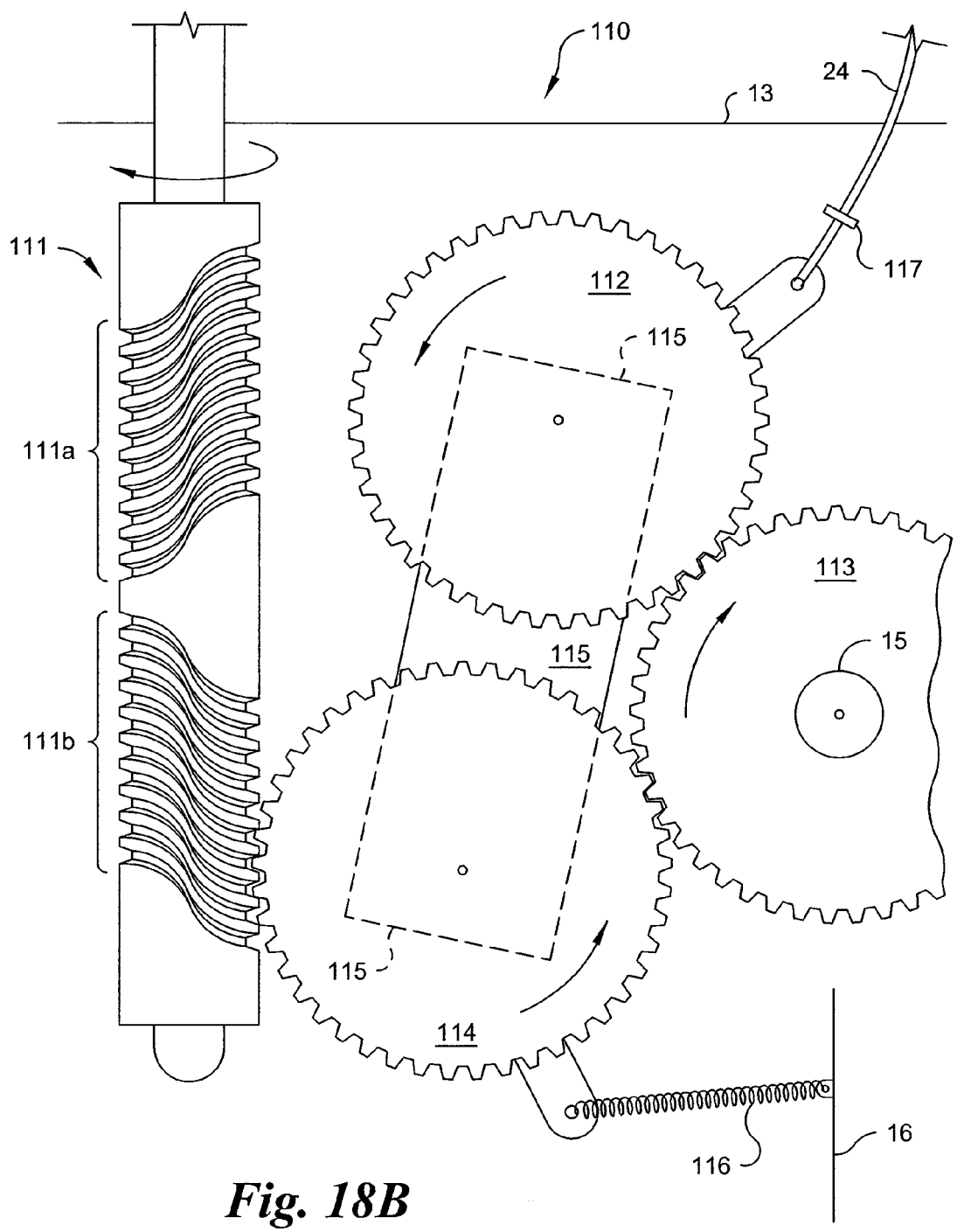
FIG. 18B is a schematic side elevation view of the reverse mechanism shown in FIG. 18, with the reverse mechanism in a third or reverse configuration.

In operation, the operator or user preferably must turn the tiller 10 "on" by placing a switch (not shown) in an "on" or start position. The user may then be required to start the power unit 14, such as by pulling a cord attached to a reel (not shown) to begin operation of the power unit 14. Alternatively, the power unit 14 may be started by turning a key (not shown) or simply depressing or pulling a button (not shown). Once the power unit 14 is operating, it is preferred that the user is required to press the interlock device in order for the tine plates 18 to begin rotating. This feature prevents the user from grabbing the lever and inadvertently operating the tiller without having full control over the tiller 10. As seen in FIGS. 18-18B and described in detail below, the tiller 10 may also be equipped with a reverse mechanization 110. The reverse mechanism 110 preferably permits a user to "back-up" or reverse the rotation of the tines 18a or brush 36 to remove debris, till or cultivate in the opposite direction.

Figure 1A:
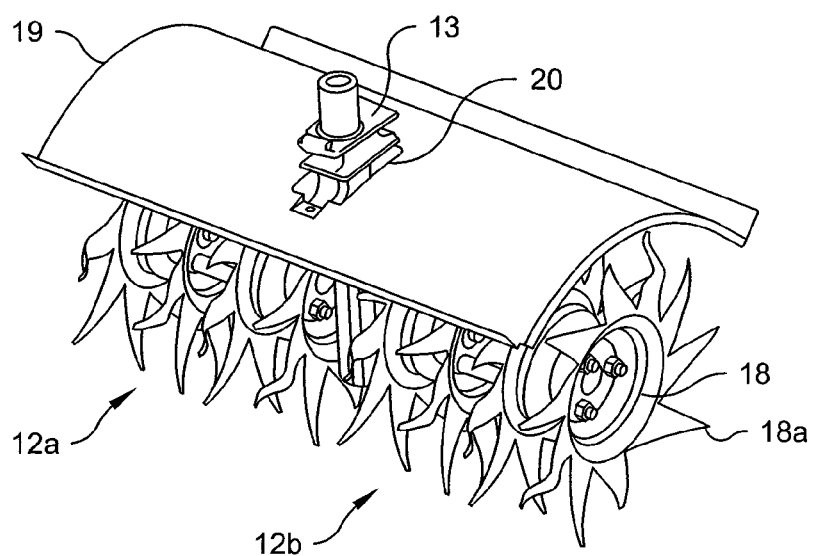
FIG. 1A is an enlarged front left-side perspective view of a base portion of the tiller or cultivator shown in FIG. 1 in a fully assembled configuration.

Preferably, the number of tine plates 18 that form the tine assemblies 12a, 12b can be selectively increased or decreased to create a "larger" or "smaller" tiller 10. For example, one or more tine plates 18 can be added to the tine shaft 15 for tilling larger areas or removed from the tine shaft 15 to create a more compact tiller 10 for smaller tilling tasks. More specifically, each tine assembly 12a, 12b preferably is able to be selectively separated or reduced in size, so that a single pair of tine plates 18 can be placed on each end 15a, 15b of the tine shaft 15 so that the tiller 10 can be decreased in lateral size to maneuver into smaller spaces, for example. Conversely, two pairs of tine plates 18 can be combined or attached to create both the right and left tine assemblies 12a, 12b as shown in FIG. 1A. The assembled right and left tine assemblies 12a, 12b can then each be attached to an opposing end 15a, 15b of the tine shaft 15 so that the tiller 10 can be increased in lateral size to cultivate larger areas, for example. The ability to provide one set of tine plates 18 on each end 15a, 15b of the tine shaft 15 or to provide two or more pairs of tine plates 18 on each end 15a, 15b of the tine shaft 15 creates a versatile or convertible tiller 10.

For example, in preferred embodiments shown in FIGS. 1-2 and 3A-3C, each tine assembly 12a, 12b includes four spaced-apart tine plates 18, wherein an inner pair 18b (FIG. 3C) of tine plates 18 are connected by a inner hub 39a (FIG. 3B) and an outer pair 18c (FIG. 3C) of tine plates 18 are connected by an outer hub 39b (FIG. 3B). The outer pair 18c of tine plates 18 can be considered the "tine extensions," while the inner pair 18b of tine plates 18 can be considered the "base tines." Either the inner pair 18b or the outer pair 18c of the tine plates 18 may be mounted to the tine shaft 15 or both pairs 18b, 18c may be connected or combined for mounting to the tine shaft 15. This feature allows the user or operator to selectively reduce or increase the lateral size of the tiller 10, which currently is not found in the prior art.

Referring specifically to FIG. 3C, the "larger" tiller 10 (FIGS. 1A, 2, 3A and 3B) is created, at least in part, by mounting both the inner and outer pair 18b, 18c of tine plates 18 to the tine shaft 15. Specifically, at least one and preferably three elongated connecting rods 40 are inserted through spaced-apart apertures (not shown in FIG. 3C) in the inner hub 39a of the inner pair 18b of tine plates 18. A longitudinal axis of each aperture preferably extends generally, if not exactly, perpendicular to a plane defined by the hub 39a. At least a portion of each rod 40 is then inserted into a passageway of at least a portion of an elongated sheath or tube 41. The sheaths 41 preferably function as a spacer or separator to maintain a predetermined or proper distance between the inner and outer pairs 18b, 18c of tines plates 18. Preferably, each connecting rod 40 extends completely through one of the sheaths 41, such that a portion of each connecting rod 40 is exposed on either end of the sheath 41. Next, at least a portion of each connecting rod 40 is inserted into one of three spaced-apart apertures (not shown in FIG. 3C) in the outer hub 39b of the outer pair 18b of the tine plates 18. A nut 42 is then preferably fastened to an outer exposed end of each connecting rod 40 to form the assembled left tine assembly 12b, for example. Next, the assembled tine assembly 12b is slid onto the tine shaft 15 and at least one of the fasteners 26 (see FIG. 3) is inserted into the passageway 17 located between the pair 18b, 18c of tine plates 18 to secure the tine assembly 12b to the tine shaft 15. It is preferred that a central axis opening (not shown), which is generally surrounded by the three spaced-apart apertures, of the inner hub 39a of the inner pair 18b of tine plates 18 is sized and shaped to receive at least a portion of the reduced diameter or flattened surface of the tine shaft 15. Alternatively, the pair 18b, 18c of tine plates 18 may be attached or combined after the inner pair 18b of tine plates 18 has been attached to the tine shaft 15.

Figure 2:
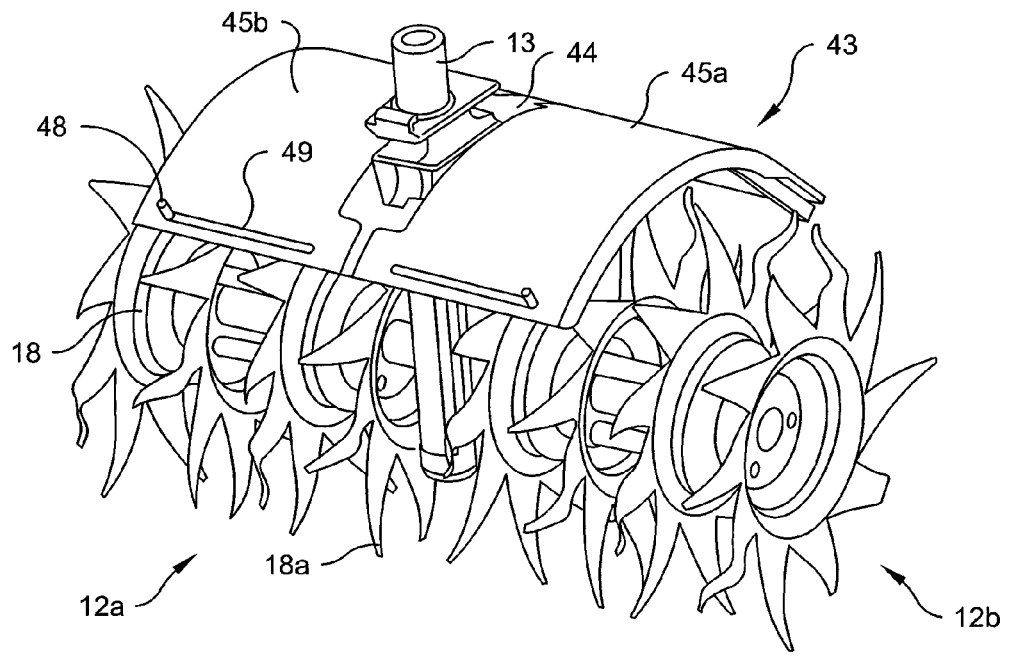
FIG. 2 is a front left-side perspective view of a base portion of a tiller or cultivator in accordance with a second preferred embodiment of the present invention, with a shield shown in a retracted configuration.

Referring to FIGS. 3 and 3C, the "smaller" tiller 10 (FIG. 3) is created, at least in part, by mounting only one of the inner and outer pairs 18b, 18c of tine plates 18 to the tine shaft 15. If the tine assemblies 12a, 12b are originally in the "larger" configuration (FIGS. 1A, 2, 3A and 3B), the inner and outer pair 18b, 18c of tine plates 18 must first be separated or disengaged. For example, with respect to the left tine assembly 12b, the user may first remove the fastener(s) 26 from the passageway 17 of the tine shaft 15 to allow removal of the entire left tine assembly 12b from the tine shaft 15. Next, the user may remove each of the nuts 42 from the ends of the connecting rods 40, such that the inner and outer pair 18b, 18c of tine plates 18 may be separate. Then, either the inner or outer pair 18b, 18c of tine plates 18 can be mounted directly to the tine shaft 15. For example, the first end 15a of the tine shaft 15 may be inserted into and through a central axis opening (not shown) of the outer hub 39b of the outer pair 18b of tine plates 18. One of the fasteners 26 is then preferably inserted into the passageway 17 of the tine shaft 15 to attach the outer pair 18b of tine plates 18 to the tiller 10. Thus, an innovative feature of the tiller 10 of the present invention is the ability to perform the work of a mid-size tiller (i.e., "larger" tiller 10 shown in FIGS. 1A, 2, 3A and 3B), weighing only approximately 38 lbs, and convert to a mini tiller (i.e., "smaller" tiller shown FIG. 3) with a weight preferably under approximately 28 lbs.

Referring to FIGS. 1 and 1A, a debris shield or tine shield 19 according to a first preferred embodiment of the present invention preferably surrounds at least a portion of the transmission 13 and is fixedly attached and/or removably attachable thereto. The tine shield 19 is preferably sized and shaped to generally cover or surround a top portion of each tine plate 18 when the tine plates 18 are properly attached to the tine shaft 15. In other words, the tine shield 19 preferably separates the motor 14 and operator from the tine assemblies 12a, 12b. The tine shield 19 preferably has a generally arcuate shape when viewed from either side (see FIG. 1A). An opening 20 is preferably centrally located in the tine shield 19 to receive and accommodate an upper portion of the transmission 13 therethrough. In the present embodiment, the tine shield 19 is formed of a single, integral or unitary piece of material, such as a metallic or polymeric material. Preferably, the tine shield 19 prevents objects, such as soil or debris, from being projected upwardly or away from the ground surface and toward the operator of the tiller 10. The tine shield 19 may be formed in a variety of sizes and shapes. For example, the tiller 10 may be provided with two separate tine shields each having a distinct surface area (i.e., large and small). The large tine shield could be removed and replaced with the small tine shield for converting the larger tiller 10 to the smaller tiller 10.

Referring to FIGS. 2-3C and 5-6A, a tine shield 43, 43' according to second and third preferred embodiments of the present invention preferably includes a central portion 44, 44', a first or left wing or extension 45a, 45a' and an opposing second or right or wing or extension 45b, 45b'. The tine shield 43, 43' of the second and third preferred embodiments is preferably sized and shaped to generally cover or surround a top portion of each tine assembly 12a, 12b when properly attached to the tine shaft 15, regardless of whether the tine assemblies 12a, 12b are in "large" (FIGS. 2 and 3A) or "small" (FIG. 3) form. Each of the central portion 44, 45', the left wing 45a, 45' and the right wing 45b, 45' preferably has a generally arcuate shape when viewed from either side. Similar to the first preferred embodiment of the tine shield 19, the central portion 44, 44' of the second and third preferred embodiments of the tine shield 43, 43' preferably includes an opening 46' (only labeled in FIG. 5) that is preferably centrally located therein to receive and accommodate the upper portion of the transmission 13 therethrough.

In contrast to the first preferred embodiment, the tine shield 43, 43' of the second and third preferred embodiment is capable of being selectively expanded or contracted to generally match the width of the left and right tine assemblies 12a, 12b, while preventing objects, such as soil or debris, from being projected upwardly or away from the ground surface and toward the operator of the tiller 10. Each of the left wing 45a', the central portion 44' and the right wing 45b' of the third preferred embodiment includes a flange 47a, 47b, 47c, respectively, that extends from both a front and rear edge thereof The flange 47a, 47b, 47c preferably forms an acute or approximately ninety degree angle with an upper or exterior portion of each of the left wing 45a, the central portion 44 and the right wing 45b.

Further, it is preferred that a bolt or dowel 48, 48' (FIGS. 2 and 3), for example, is fixedly secured at opposing ends or corners of each wing 45a, 45b of the second preferred embodiment and each flange 47b of the central portion 44' of the third preferred embodiment. Each bolt 48, 48' is preferably sized and shaped to fit within a slot or groove 49, 49' of each wing 45a, 45b of the second preferred embodiment or one of the flanges 47a, 47c of the left and right wings 45a', 45b' of the third preferred embodiment. The grooves 49, 49' preferably extend generally the entire length of the left and right wings 45a, 45a', 45b, 45'. As shown in FIG. 3C, a nut 50a and washer 50b may be associated with each bolt 48' of the third preferred embodiment. Thus, while the central portion 44, 44' is preferably fixedly attached to the transmission 13, either or each of the left and right wings 45a, 45a', 45b, 45b' are movable or slidable with respect to the central portion 44, 45' through the bolt 48, 48' and slot 49, 49' combinations. Movement or repositioning of the wings 45a, 45a', 45b, 45b' permits the user to more clearly see and maneuver around or between objects during tilling, for example, and eliminates the need for the user to remove the tine shield 43, 43' and store the tine shield 43, 43' to reduce the size of the tiller 10 when not in use. Further, the design of the tiller 10 permits folding or sliding into a compact size, enabling the tiller 10 to be transported in the trunk of a car (not shown).

The tine shield 43, 43' may also include a feature to prevent a user from operating the tiller 10 if the tine shield 43, 43' is not sized to properly cover all or substantially all of the tine assemblies 12a, 12b. Specifically, an interlocking device or sensor (not shown) may be included on or within the tine shield 43, 43' so that the detection of the proper number or sized tine plates 18 is sensed and confirmed. Failure to detect the proper number or sized tine plates 18 preferably stops the operation of the tiller 10. It is preferably possible to lock the power unit 14 if the detector does not receiving the proper signal. One method for doing this is to imbed a magnet (not shown) into one or more tines 18a. If the large tine assemblies 12a, 12b are attached to the tine shaft 15 and the tine shield 43 is not in the extended position, the sensor would detect that the tine shield 43 is missing or improperly configured, and operation of the tiller 10 would not be possible. Alternatively, a hall effect sensor (not shown), a sonar device, or a light beam, which must be interrupted or broken to allow operation of the tiller 10, could be used for the detection of the tine plates 18. Alternatively, a mark may be encoded or embedded into one of the tines 18a. If the proper tine assemblies 12a, 12b and tine shield 43, 43' pair were not put in place, the alignment would not complete the circuit and the power unit 14 would not be able to run.

Referring to FIG. 7, a fourth preferred embodiment of the tine shield 51 preferably includes left and right wings or extensions 52a, 52b that are pivotally or rotatably attached to opposing ends of a central shield portion 53. Specifically, a barrel or living hinge 53a, for example, may attach an inner edge of each of the left and right wings 52a, 52b to an outer edge of the central portion 53. When a particular tilling task requires the "larger" tiller 10, the operator can simply pivot or rotate the wings 52a, 52b downwardly to cover the larger or extended tine assemblies 12a, 12b (FIG. 2). However, when a smaller tilling task is presented, the operator can pivot or rotate the wings 52a, 52b upwardly or away from the ground surface so as only to cover the smaller or reduced tine assemblies 12a, 12b (FIG. 3). A latch or locking mechanism (not shown) may be used to hold the wings 52a, 52b in either or both positions. Alternatively, the tine shield 51 may be configured to be rolled-up, rolled-out, folded, unfolded, or turned, for example, to allow the user to selectively expand or reduce the size or shape of the tine shield 51.

Figure 8:
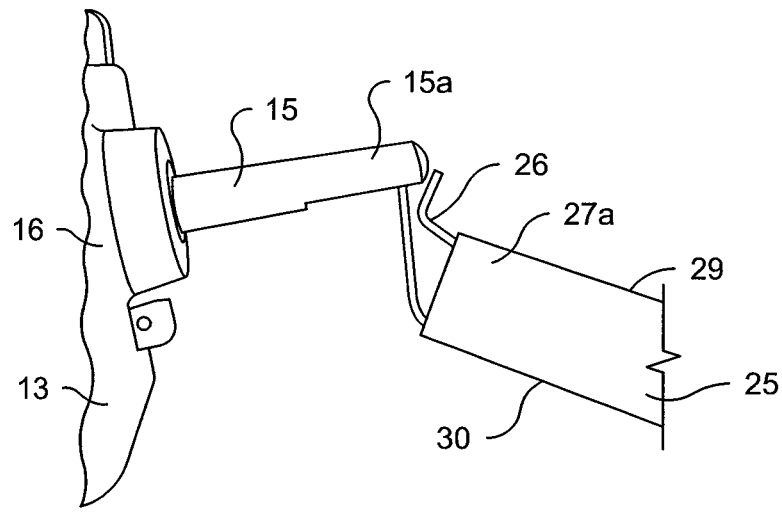
FIG. 8 is a top perspective view of a tool for inserting or removing a fastener into or from the base portion of a tiller or cultivator in accordance with a preferred embodiment of the present invention.
Figure 8A:
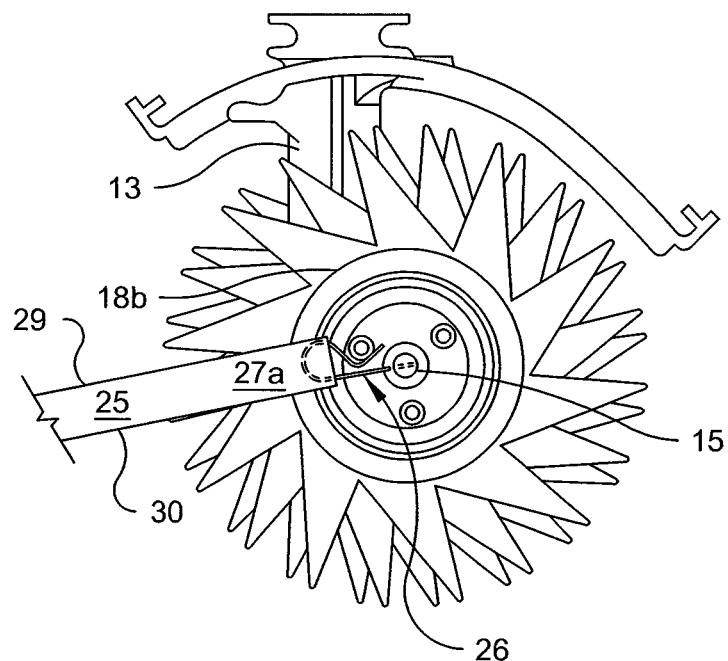
FIG. 8A is a left-side elevation view of the tool and fastener shown in FIG. 8, wherein the tool is being used to insert the fastener into the first end of the shaft of the tiller or cultivator.
Figure 16:
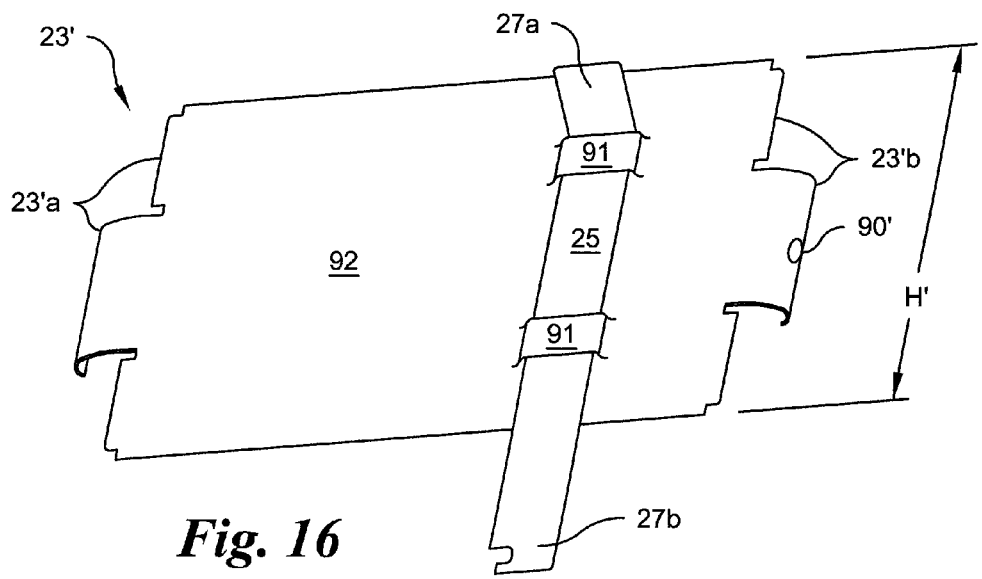
FIG. 16 is a perspective view of a cross member in accordance with a preferred embodiment of the present invention, wherein the tool of FIGS. 8 and 8A is shown attached to the cross member.

Referring to FIGS. 8, 8A and 16, a preferred embodiment of a tool 25 is shown for inserting or removing one or more of the fasteners 26 into or out of the passageway 17 of the tine shaft 15. The tool 25 preferably includes a first end 27a that is sized and shaped to receive or hold at least a portion of one of the fasteners 26. An opposing second end 27b of the tool 25 may include a hook or catch (see FIG. 16) for engaging or surrounding a portion of the fastener 26 to allow the user to more easily remove the fastener 26 from the passageway 17 of the tine shaft 15. The tool 25 is preferably of a sufficient length, as measured from the first end 27a to the second end 27b, to allow a user to insert the fastener 26 into the passageway 17 of the tine shaft 15 without requiring the user's hand(s) to enter the space between adjacent tine plates 18.

The tool 25 allows a user or operator to more easily insert or remove the fastener 26 from the passageways 17 of the tine shaft 15 without unnecessarily disassembling certain portions of the tiller 10 or risking injury by inserting a hand or finger proximate the sharp blade 18a of a tine plate 18. In conventional tillers, a tool is not necessary to insert a fastener into an end of a tine shaft because the end is exposed and relatively easily accessible to the user. However, the first and second ends 15a, 15b of the tine shaft 15 of the present invention may not be as easily accessible because the ends 15a, 15b can be located between the pair 18b, 18c of tine plates 18.

Figure 9:
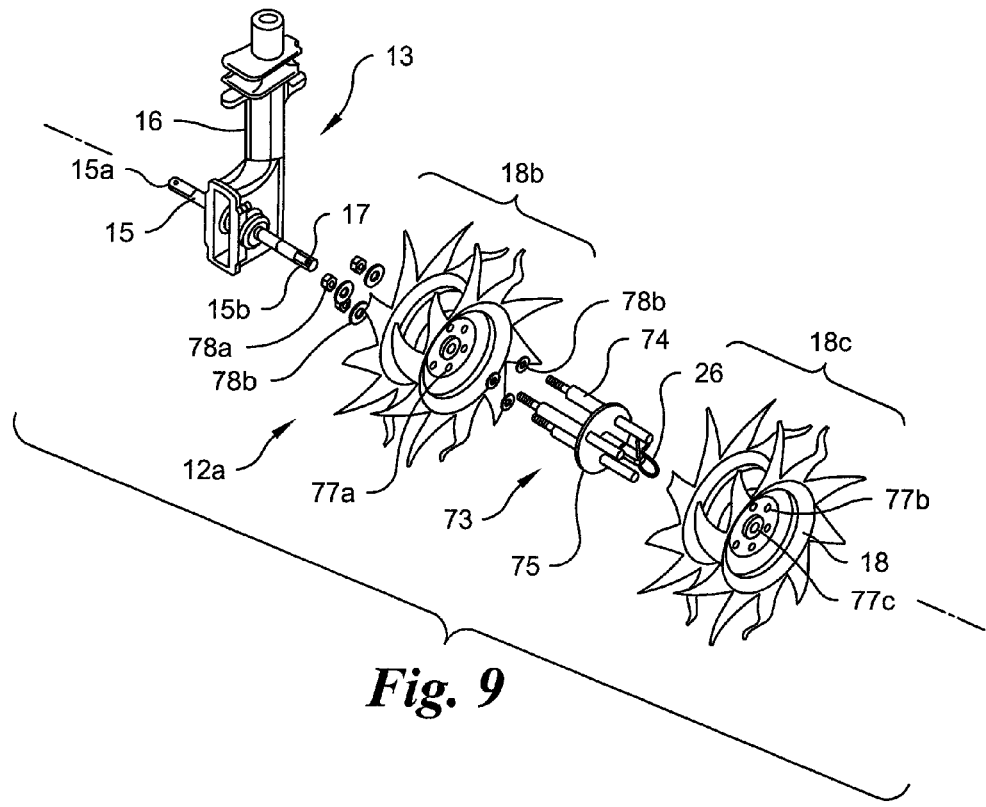
FIG. 9 is a top perspective exploded view of a partially disassembled portion of a tiller or cultivator in accordance with a preferred embodiment of the present invention.
Figure 9A:
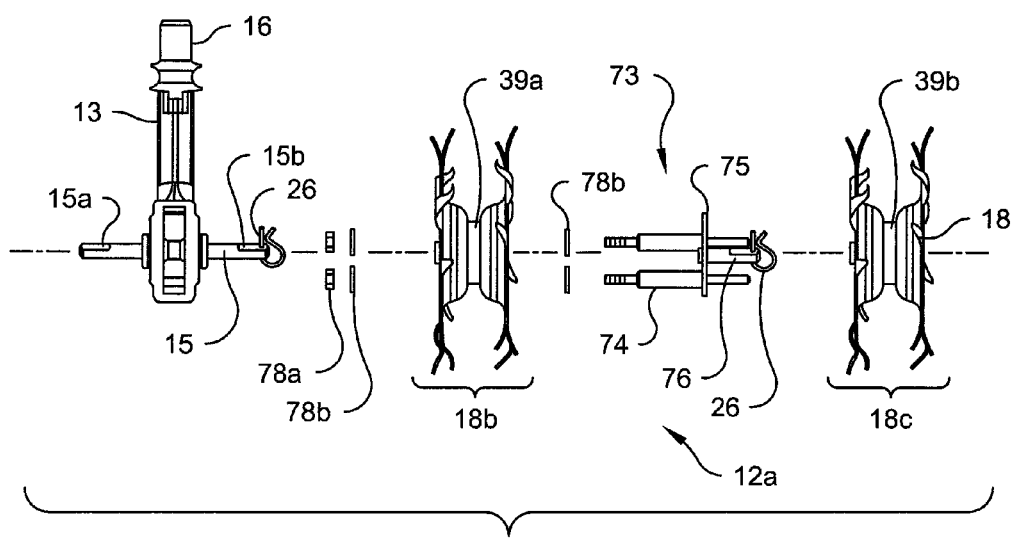
FIG. 9A is a front elevation exploded view of the partially disassembled portion of the tiller or cultivator shown in FIG. 9.
Figure 9B:
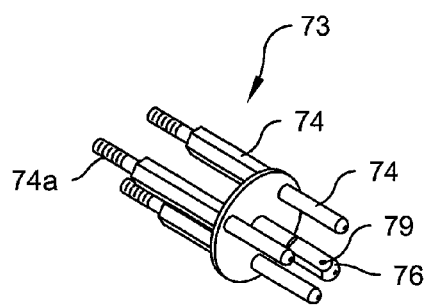
FIG. 9B is an enlarged top perspective view of a connector piece shown in FIGS. 9 and 9A.
Figure 9C:
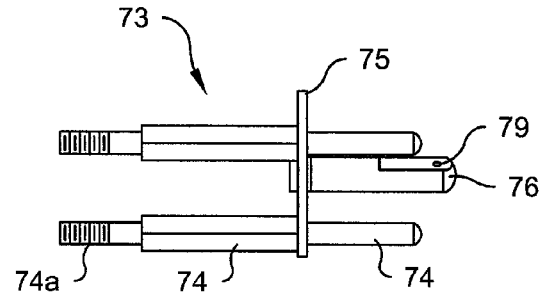
FIG. 9C is a side elevation view of the connector piece shown in FIG. 9B.

FIGS. 9-9C show a second preferred embodiment of the "large" right tine assembly 12a, with a second preferred embodiment of the "large" left tine assembly 12b being a mirror image thereof In the presently preferred embodiment, the inner pair 18b of tine plates 18 is attached to the outer pair 18c of tine plates 18 by a connector piece 73. The connector piece 73 preferably includes three connecting rods 74 fixedly or removably held in a spaced-apart relation by a plate 75 that preferably defines a plane that extends perpendicularly to a longitudinal axis of each connecting rod 74. At least one end of each connecting rod 74 preferably includes a threaded portion 74a (FIGS. 9B and 9C). A supporting shaft 76, which is preferably identical or similar to either end 15a, 15b of the tine shaft 15, preferably extends from at least one side of the plate 75.

Figure 9D:
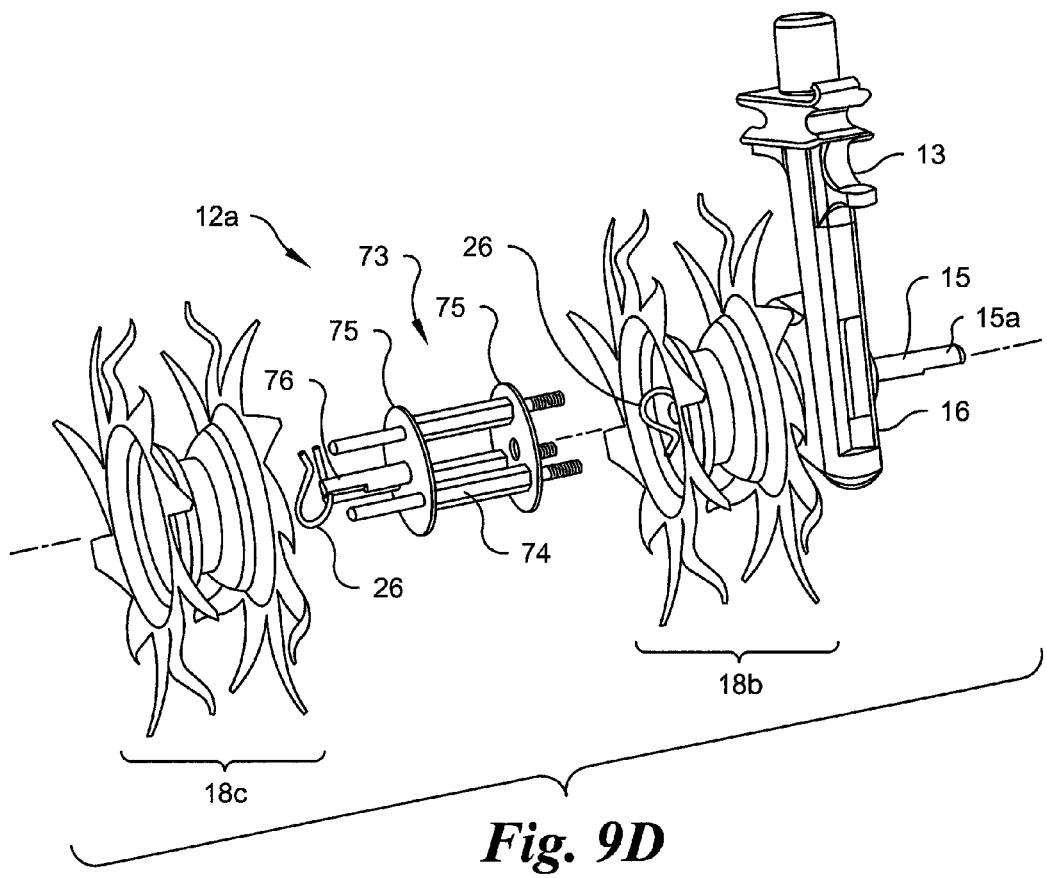
FIG. 9D is a rear perspective exploded view of a partially disassembled portion of a tiller or cultivator in accordance with an alternative preferred embodiment of the present invention.

In operation, the tine plates 18 may be attached to the tine shaft(s) 15 in a variety of manners. For example, the connecting rods 74 of the connector piece 73 may be inserted into a respective aperture 77a of the inner pair 18b of tine plates 18. The nut(s) 78a and washer(s) 78b may then be attached to at least a portion of each connecting rod 74 so as to attach the connector piece 73 to the inner pair 18b of the tine plates 18. The combined connector piece 73 and inner pair 18b of tine plates 18 may then be attached to the tine shaft 15. Alternatively, the inner pair 18b of tine plates 18 may first be attached directly to the tine shaft 15, as if to create the "smaller" tiller, or the inner pair 18b can be first attached directly to the outer pair 18c of tine plates 18. Next, an end of each connecting rod 74 is preferably inserted into spaced-apart apertures 77a (FIG. 9) in the inner hub 39a of the inner pair 18b of tine plates 18. A nut 78a and a washer 78b are preferably threaded onto one end 74a of each connecting rod 74 to attach the connector piece 73 to the inner pair 18b of tine plates 18. The opposing end of each connecting rod 74 is then inserted into spaced-apart apertures 77b (FIG. 9) in the outer hub 39b of the outer pair 18c of the tine plates 18. In addition, the support shaft 76 is inserted through a central opening 77c (FIG. 9) of the outer hub 39b of the outer pair 18c of the tine plates 18. Finally, a fastener 26 is preferably inserted into a passageway 79 of the support shaft 76. As mentioned above, it is understood that the inner and outer pair 18b, 18c of tine plates 18 may first be attached together, and then the combined pairs 18b, 18c may be attached to the tine shaft 15. FIG. 9D shows a modified version of the above-described embodiment of the connector piece 73 shown in FIGS. 9-9C. In the modified version shown in FIG. 9D, the connector piece 73 includes two spaced-apart plates 75 but is used in generally the same manner.

Figure 10:
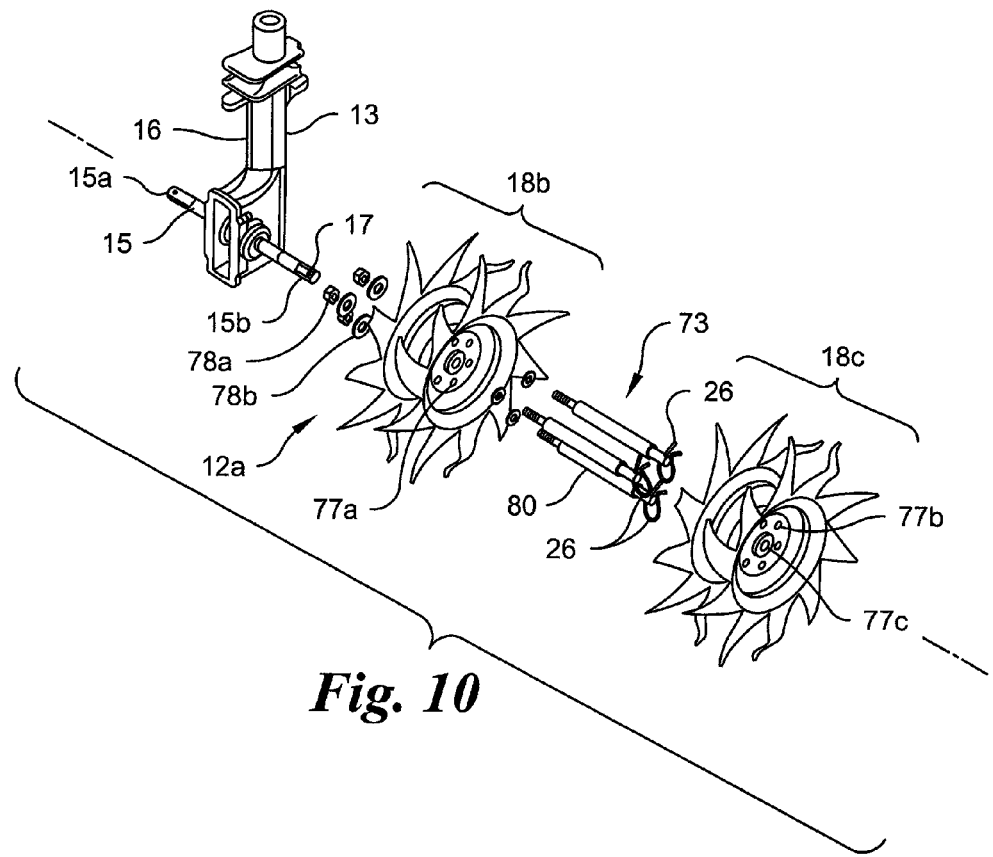
FIG. 10 is a front perspective exploded view of a partially disassembled portion of a tiller or cultivator in accordance with another preferred embodiment of the present invention.
Figure 10A:
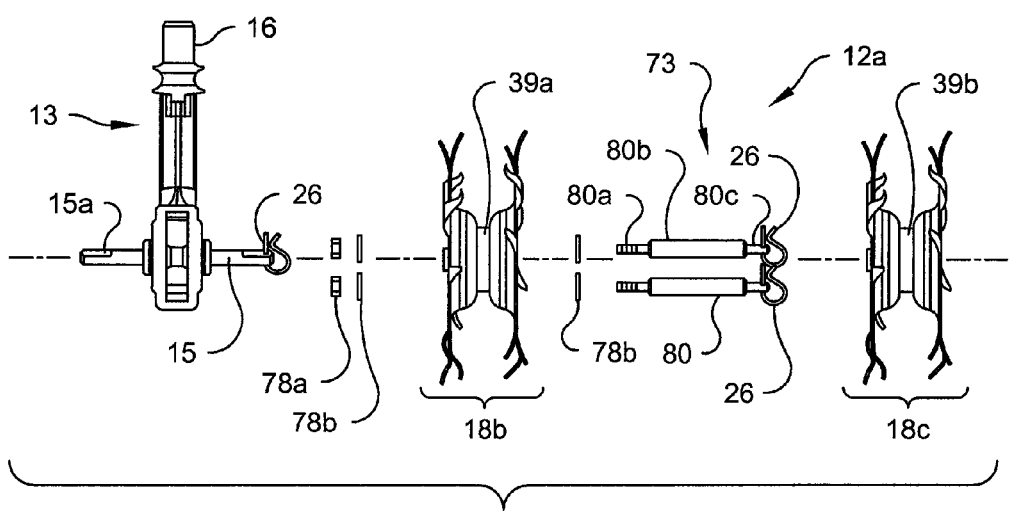
FIG. 10A is a front elevation exploded view of the partially disassembled portion of the tiller or cultivator shown in FIG. 10.

FIGS. 10 and 10A show a third preferred embodiment of the "large" right tine assembly 12a, with a third preferred embodiment of the "large" left tine assembly 12b being a mirror image thereof. The third preferred embodiment is substantially similar to the embodiments described above. Specific similarities between the second and third preferred embodiments are omitted herein for the sake of brevity and convenience, and therefore is not limiting. A distinguishing feature of the third preferred embodiment is that the connector piece 73 includes three connecting rods 80, wherein each connecting rod 80 includes a threaded first end 80a, a middle portion 80b of increased size or diameter, and an opposing second end 80c having a passageway (not shown) therethrough. The passageway in the second end 80c is preferably sized and shaped to receive at least a portion of a fastener 26 therein.

In operation of one preferred method, after the inner pair 18b of tine plates 18 is attached directly to the tine shaft 15, as described in detail above, the first end 80a of each connecting rod 80 is then preferably inserted into the spaced-apart apertures 77a in the inner hub 39a of the inner pair 18b of the tine plates 18 and the washers 78b and nuts 78a are installed on the first end 80a of each connecting rod 80. Next, the second end 80c of each connecting rod 80 is preferably inserted into one of the spaced-apart apertures 77b in the outer hub 39b of the outer pair 18c of the tine plates 18. It is then preferred that one fastener 26 is inserted into the passageway of the second end 80c of each connecting rod 80. Alternatively, it is understood that the inner and outer pair 18b, 18c of tine plates 18 may be attached together before the combined pairs 18b, 18c are attached to the tine shaft 15.

Figure 11:
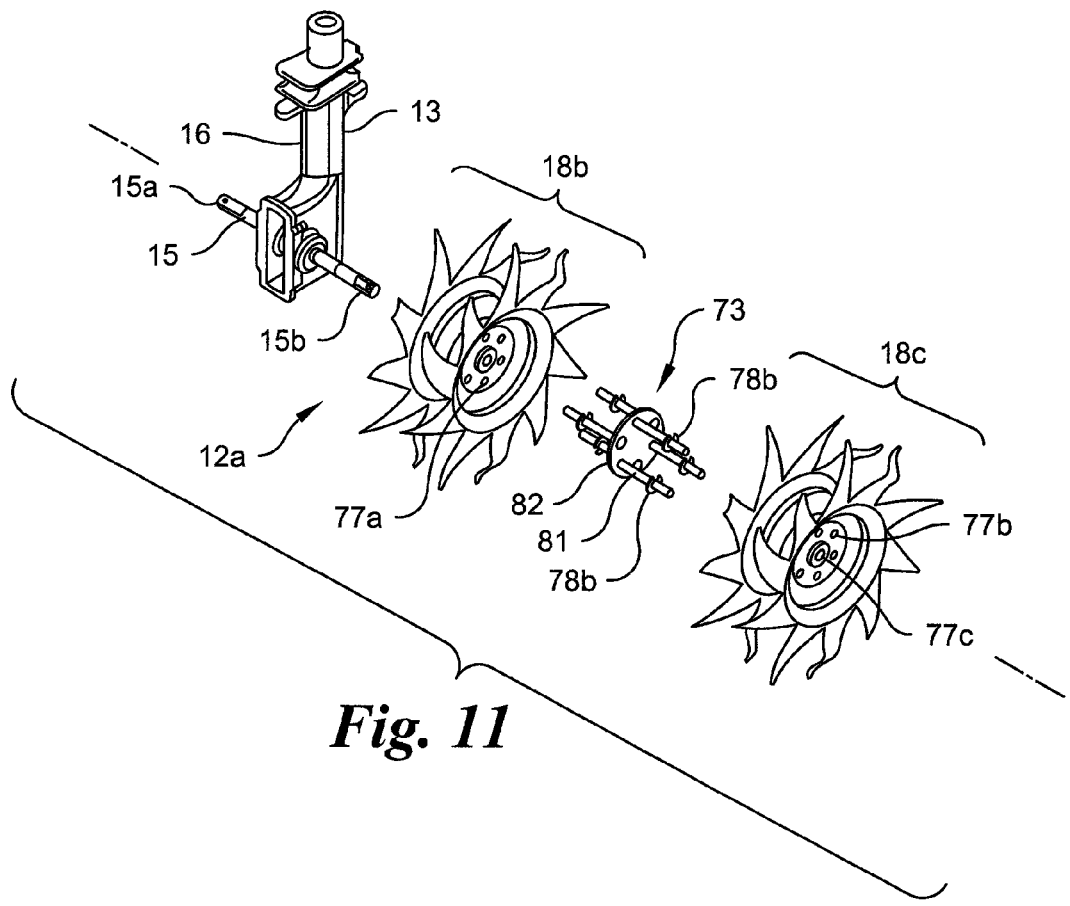
FIG. 11 is a front perspective exploded view of a partially disassembled portion of a tiller or cultivator in accordance with another preferred embodiment of the present invention.
Figure 11A:
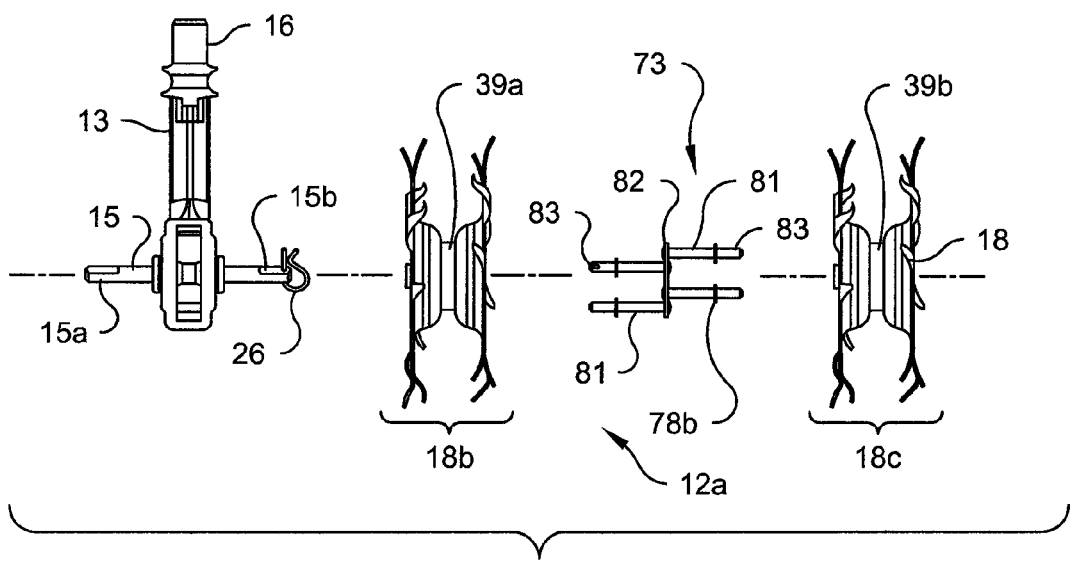
FIG. 11A is a front elevation exploded view of the partially disassembled portion of the tiller or cultivator shown in FIG. 11.
Figure 11B:
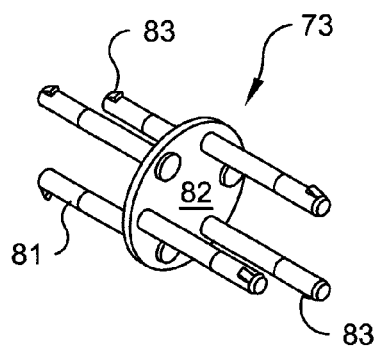
FIG. 11B is a greatly enlarged top perspective view of a connector piece shown in FIGS. 11 and 11A.
Figure 11C:
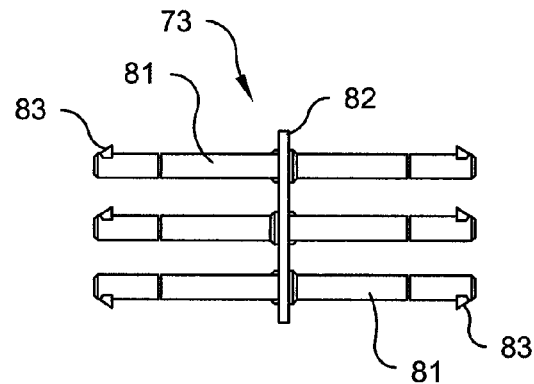
FIG. 11C is a side elevation view of the connector piece shown in FIG. 11B.

FIGS. 11-11C show a fourth preferred embodiment of the "large" right tine assembly 12a, with a fourth preferred embodiment of the "large" left tine assembly 12b being a mirror image thereof. The fourth preferred embodiment is substantially similar to the second preferred embodiment described above. Specific similarities between the second and fourth preferred embodiments are omitted herein for the sake of brevity and convenience, and therefore is not limiting. A distinguishing feature of the fourth preferred embodiment is that the connector piece 73 includes six connecting rods 81, wherein three of the connecting rods 81 extend from a first side of a plate 82 and the three remaining connecting rods 81 extend from an opposing second side of the plate 82. As seen in FIGS. 11 and 11B, it is preferred that no two connecting rods 81 that extend from opposing sides of the plate 82 define a common longitudinal axis. In other words, it is preferred that each connecting rod 81 is staggered around the circumference or perimeter of the plate 82.

Further, it is preferred that each connecting rod 81 includes at least one radially outwardly extending projection or detent 83 proximate an end thereof distal from the plate 82. The at least one projection 83 preferably includes a generally angled surface. Each projection 83 is preferably sized and shaped to maintain or hold each tine pair 18b, 18c onto the connector piece 73 and generally eliminate the need for a fastener 26. A snap-ring or washer 78b (see FIGS. 11 and 11A) may be removably attached to each connecting rod 81. In light of the description provided above for assembling the second and third preferred embodiments of the "larger" right tine assembly 12a, one of ordinary skill in the art would understand how to assemble the "larger" right tine assembly 12a of the fourth preferred embodiment. As a result, description thereof will be omitted for the sake of brevity.

Figure 12:
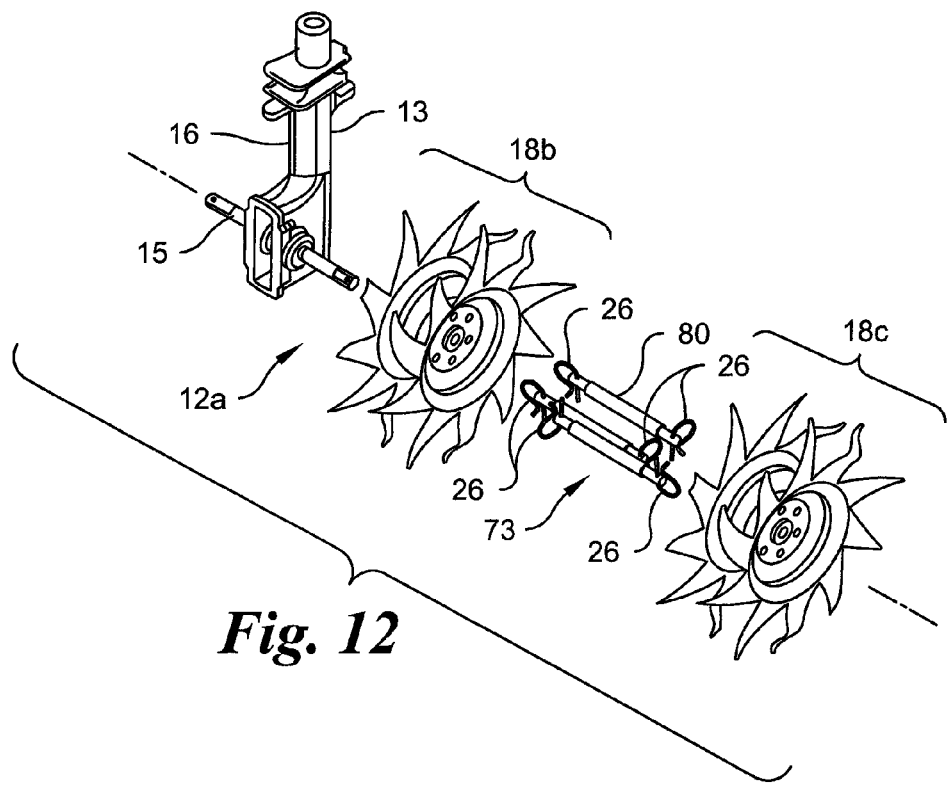
FIG. 12 is a front perspective exploded view of a partially disassembled portion of a tiller or cultivator in accordance with a another preferred embodiment of the present invention.
Figure 12A:
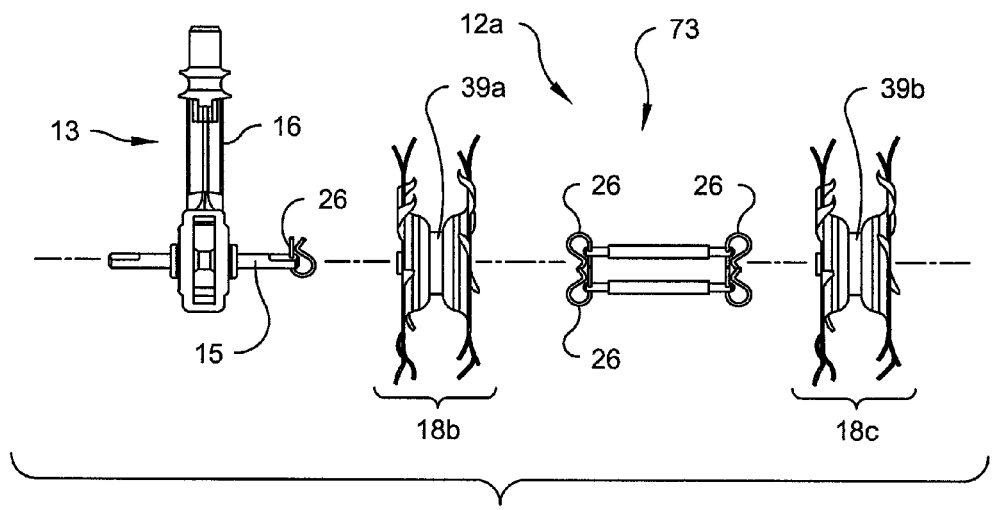
FIG. 12A is a front elevation exploded view of the partially disassembled portion of the tiller or cultivator shown in FIG. 12.

FIGS. 12 and 12A show a fifth preferred embodiment of the "large" right tine assembly 12a, with a fifth preferred embodiment of the "large" left tine assembly 12b being a mirror image thereof. The fifth preferred embodiment is substantially similar to the third preferred embodiment described above. Specific similarities between the third and fifth preferred embodiments are omitted herein for the sake of brevity and convenience, and is not limiting. A distinguishing feature of the fifth preferred embodiment is that the connector piece 73 includes a fastener 26 on each end of the three spaced-apart connecting rods 80. The fasteners 26 properly maintain the connector piece 73 between the two pair 18b, 18c of tine plates 18, and eliminate the need for the threaded first end 80a and various nuts 78a and washer 78b of the third preferred embodiment (FIGS. 10 and 10A).

Figure 13:
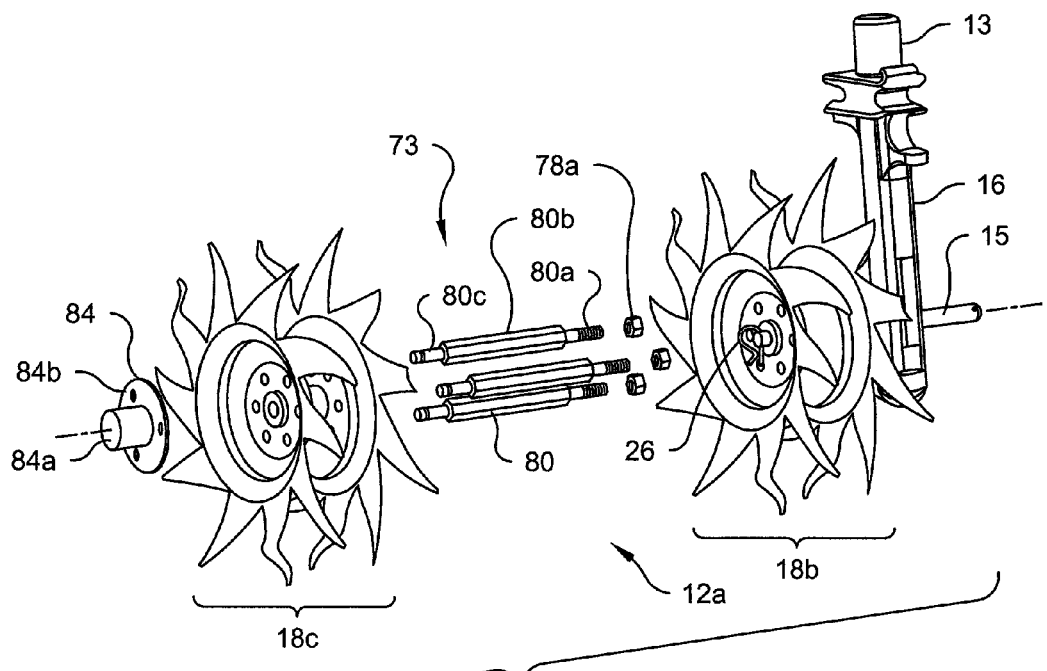
FIG. 13 is a rear perspective exploded view of a partially disassembled portion of a tiller or cultivator in accordance with another preferred embodiment of the present invention.
Figure 13A:
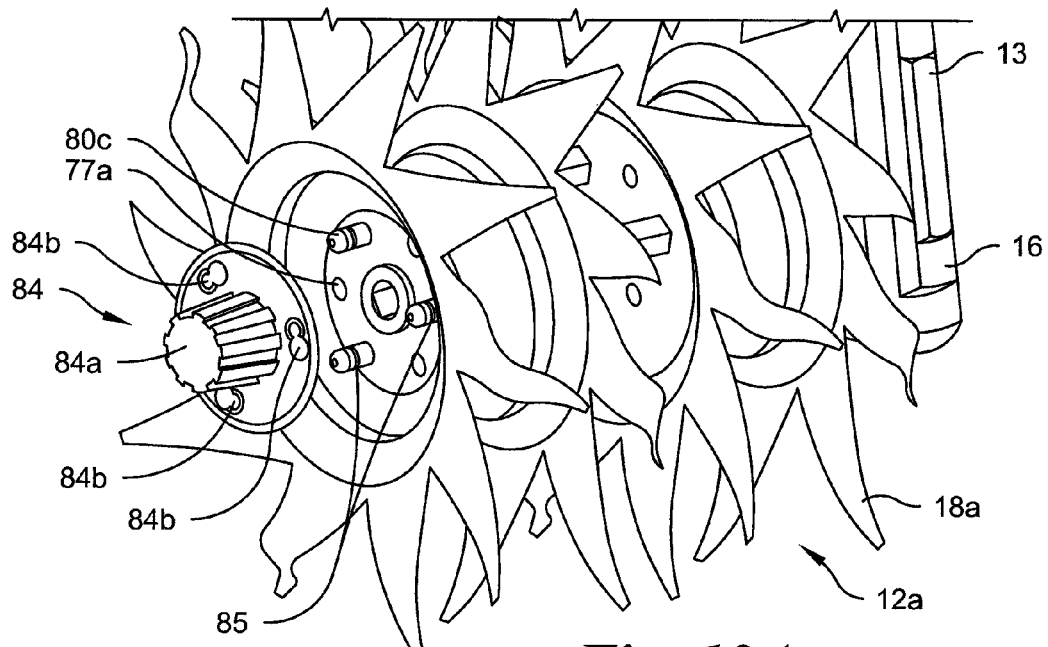
FIG. 13A is an enlarged rear perspective view of the partially disassembled portion of the tiller or cultivator shown in FIG. 13.

FIGS. 13 and 13A show a sixth preferred embodiment of the "large" right tine assembly 12a, with a sixth preferred embodiment of the "large" left tine assembly 12b being a mirror image thereof. The sixth preferred embodiment is substantially similar to the third preferred embodiment described above. Specific similarities between the third and sixth preferred embodiments are omitted herein for the sake of brevity and convenience, and is not limiting. A distinguishing feature of the sixth preferred embodiment is that the connector piece 73 includes a locking cap 84 for removably attaching to the second end 80c of each of the three spaced-apart connecting rods 80. As shown in FIG. 13A, the locking cap 84 preferably includes a handle or gripping portion 84a generally surrounded by three spaced-apart openings 84b that are each sized and shaped to receive and retain at least a portion of the second end 80c of one of the connecting rods 80. Each opening 84b preferably includes a larger, generally circular portion adjacent to a smaller, generally circular portion to create a selectively lockable cap 84.

The locking cap 84 preferably properly maintains the connector piece 73 between the two pair 18b, 18c of tine plates 18, and eliminates the need for the fasteners 26. Specifically, after the inner and outer pair 18b, 18c of tine plates 18 are attached together and then slid onto the tine shaft 15, one fastener 26 is preferably inserted into the passageway 17 of the tine shaft 15 and the locking cap 84 is slid over at least a portion of the second end 80c of each connecting rod 80. The locking cap 84 is then preferably rotated with respect to the connecting rods 80 such that the smaller portion of each opening 84b fits within a groove 85 at or in the second end 80c of each connecting rod 80. The combination of the smaller portion of each opening 84b and the groove 85 in each connecting rod 80 creates a secure connection between the connector piece 73 and the right tine assembly 12a.

Figure 14:
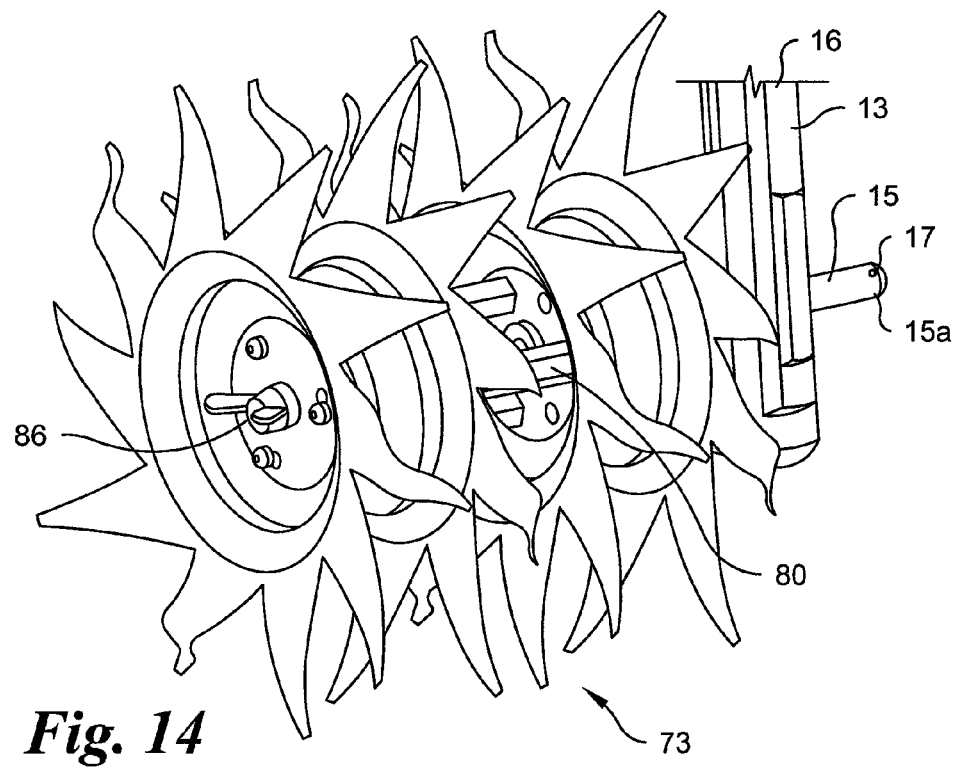
FIG. 14 is a front perspective view of a partially disassembled portion of a tiller or cultivator in accordance with another preferred embodiment of the present invention.

FIG. 14 shows a seventh preferred embodiment of the "large" right tine assembly 12a, with a seventh preferred embodiment of the "large" left tine assembly 12b being a mirror image thereof. The seventh preferred embodiment is substantially similar to the sixth preferred embodiment described above. Specific similarities between the sixth and seventh preferred embodiments are omitted herein for the sake of brevity and convenience, and is not limiting. A distinguishing feature of the seventh preferred embodiment is that the connector piece 73 includes a wing nut 86 or similar finger-tightening device for fixing the right tine assembly 12a, for example, to the tine shaft 15. The wing nut 86 is preferably directly attachable to a distal end of a support shaft (not shown) similar to the support shaft 76 of the second preferred embodiment (FIGS. 9-9C) describe above. The wing nut 86 eliminates the need for the locking cap 84 of the sixth preferred embodiment.

Figure 15:
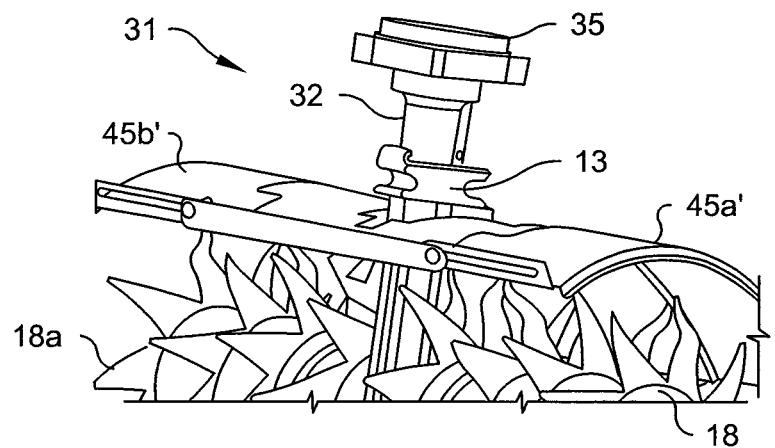
FIG. 15 is a rear perspective view of a preferred embodiment of a clutch drum assembly shown in an installed configuration on the transmission housing of the tiller or cultivator shown in FIG. 3A.
Figure 15A:
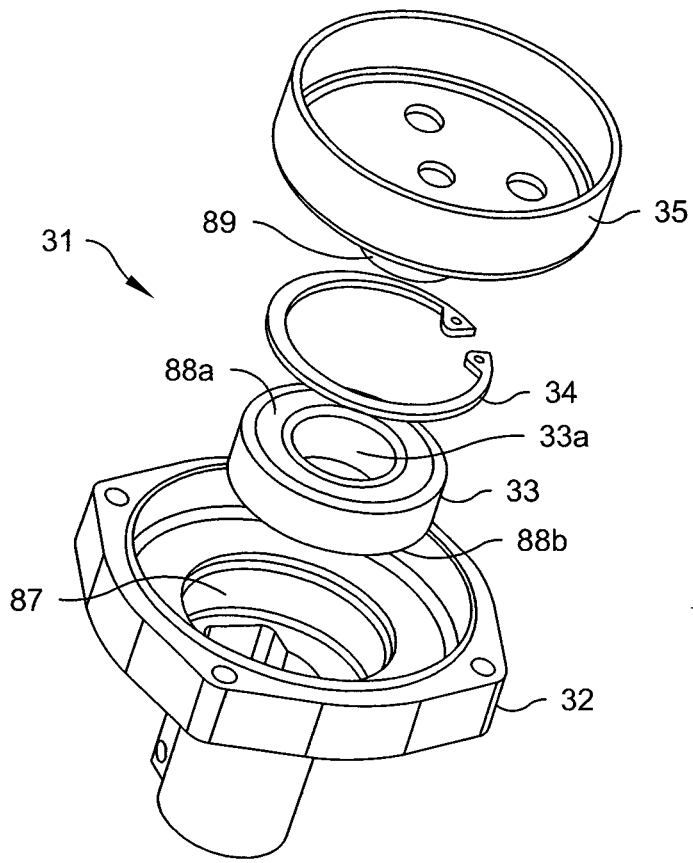
FIG. 15A is an enlarged exploded top perspective view of the clutch drum assembly shown in FIG. 15.

Referring to FIGS. 15 and 15A, the tiller 10 preferably includes a clutch or clutch drum assembly 31 that interfaces between the power unit 14 and the transmission 13. In other words, the clutch drum assembly 31 is installed between the motor 14 and the transmission 13 and is the link between the motor 14 and the transmission 13, so that the tines 18a can stop spinning or rotating without the operator having to turn off the motor 14. The clutch 31 of the present invention is capable of withstanding the excessive vibrations the tine extensions 18a may create. As seen in FIG. 15A, the clutch 31 preferably includes a clutch drum 32, a bearing 33, a snap or o-ring 34 and a clutch adapter 35. The clutch 31 is preferably fixedly attached to the power unit 14 by one or more bolts (not shown) and is attached to the housing 16 of the transmission 13 by tightening a bolt (not shown) that preferably extends in a direction generally perpendicular to the one or more bolts that attach the clutch drum 32 to the power unit 14.

When properly assembled, the generally circular or cylindrical bearing 33 is located within a generally circular recessed area 87 of the clutch drum 32. The bearing 33 preferably includes a generally circular central opening 33a that extends completely through the bearing 33 from a top surface 88a to a bottom surface 88b thereof. It is preferred that the generally circular snap ring 34 is placed directly on the top surface 88a of the bearing 33, opposite the recessed area 87. A generally circular, centrally-located extension 89 of the clutch adapter 35 is preferably inserted within an opening of the snap ring 34, the opening 33a of the bearing 33 and into an interior of the clutch drum 32.

This clutch 31 preferably works automatically through the use of centrifugal force. A pair of clutch shoes (not shown) is preferably attached to the motor 14, along with a spring (not shown) that keeps the clutch shoes in a retracted configuration. If the clutch shoes are spinning slowly enough, the clutch shoes are held against the motor shaft by the spring. If the motor 14 spins fast enough (because the operator has pulled the throttle trigger to begin tilling), the centrifugal force on the clutch shoes overcomes the force being applied by the spring, and the clutch shoes are slung outwardly. The clutch shoes preferably come in contact with an inside of the clutch adapter 35 and the clutch adapter 35 starts spinning. The clutch adapter 35, the clutch shoes and the shaft of the motor 14 become a single spinning unit due to the friction between the clutch shoes and the clutch adapter 35, thus transmitting rotation through the transmission 13 and drive shaft(s) 15 to the tines 18a. At this point, the tines 18a begin to move or rotate. The clutch 31 preferably disengages when the motor 14 is idling.

FIG. 16 shows a second preferred embodiment of the cross member 23', wherein like numerals are utilized to identify like elements and a prime symbol (') is utilized to distinguish like components of the cross member 23' of the second preferred embodiment from the cross member 23 of the preferred embodiment described above. In the second preferred embodiment, only a portion of first and second ends 23a', 23b' are generally arcuate or concave in shape. More specifically, a central portion of each end 23a', 23b', as measured along the height H' of the cross member 23', is generally arcuate or concave, while the remaining portions of each end 23a', 23b' are planar or coplanar with the body of the cross member 23'.

It is preferred that a hole 90' extends through the central portion of each end 23a', 23b'.

The body or middle of the cross member 23' preferably includes at least one and possibly two vertically-spaced apart catches 91. The catches 91 preferably extend from or are located on a rear surface 92 of the cross member 23'. Each catch 91 is preferably sized and shaped to receive and retain at least a portion of the tool 25. Thus, the tool 25 may be removably attached to the cross member 23'.

Figure 17:
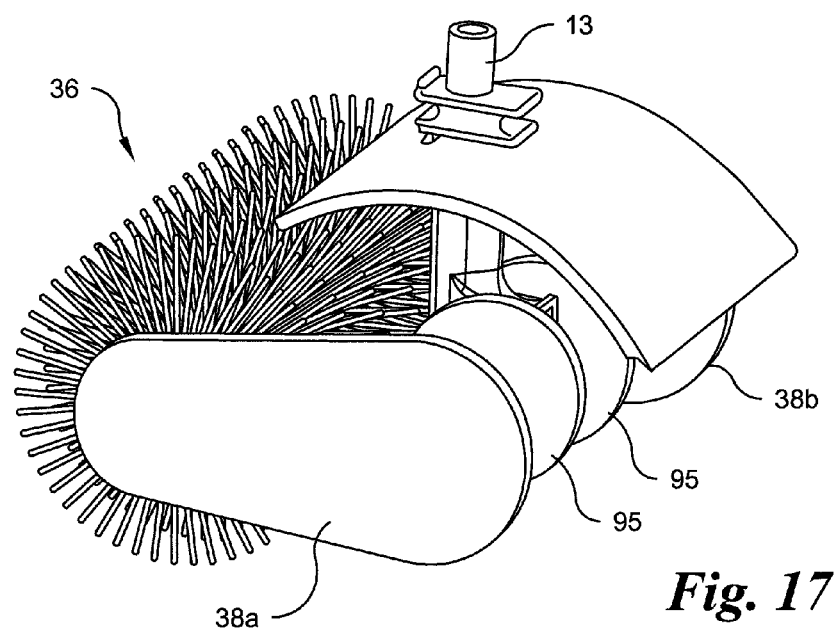
FIG. 17 is an top perspective view of brush attachment in accordance with a preferred embodiment of the present invention, wherein the brush attachment is shown in place of tines on the base portion of the tiller or cultivator of FIG. 1.
Figure 17A:
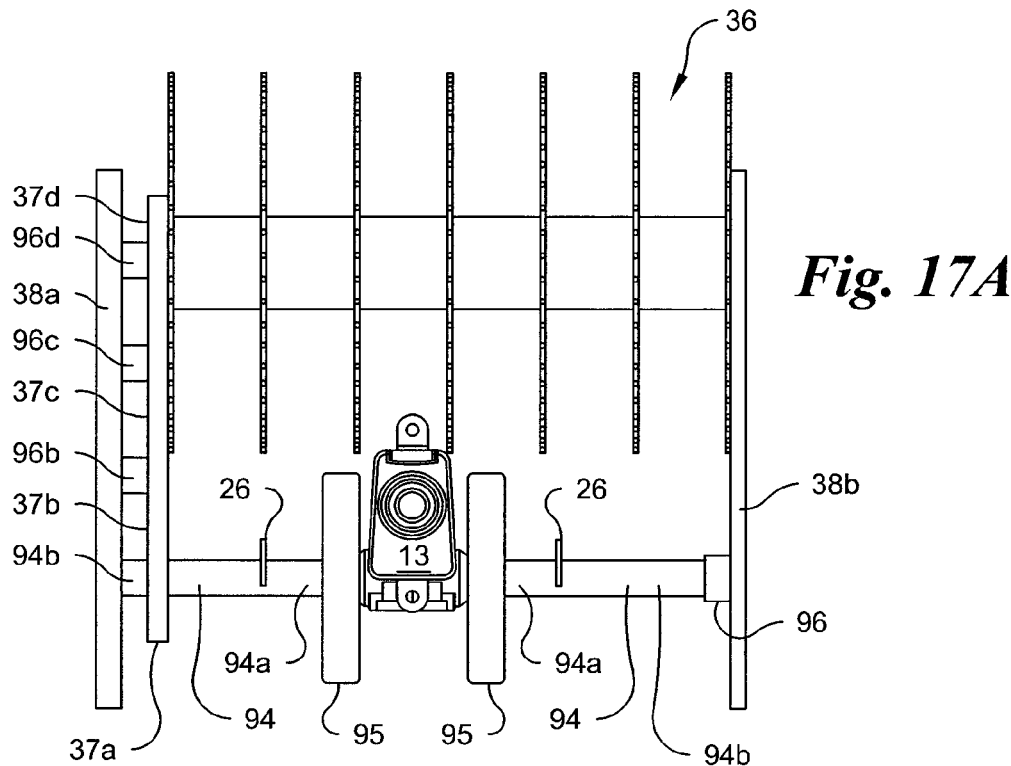
FIG. 17A is a top plan view of the brush attachment shown in FIG. 17 and the base portion of the tiller or cultivator.
Figure 17B:
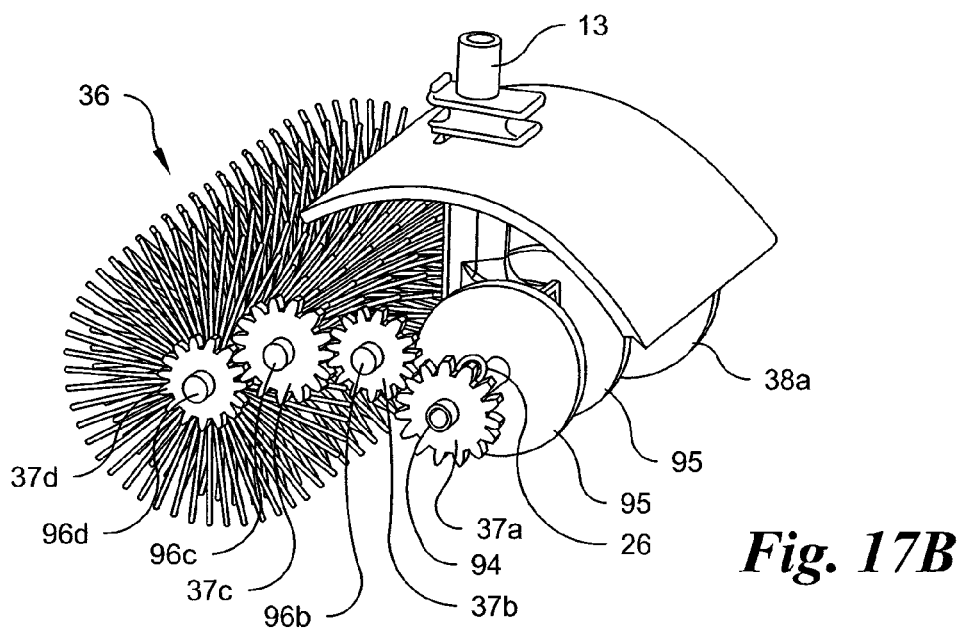
FIG. 17B is a top perspective view of the brush attachment shown in FIGS. 17 and 17A and the base portion of the tiller or cultivator, with a portion removed for clarity.

Referring to FIGS. 17-17B, the tiller 10 may be selectively converted or modified to replace the tine plates 18 with the brush 36, for example, for dispersing dirt or snow. The brush 36 is preferably sized and shaped to work in conjunction with various portions of the tiller 10. Specifically, a tube or cover 94 is preferably placed or slid over the tine shaft(s) 15 (not shown in FIGS. 17-17B). One or more fasteners 26 are preferably inserted through a hole of each tube 94 and into the passageway 17 at each end 15a, 15b of the tine shaft 15, such that tubes 94 are rotatably fixed to the tine shaft(s) 15 and rotation of the tine shaft 15 causes rotation of the tubes 94. A first or inner end 94a of each tube 94 preferably includes a freely-rotatable wheel 95 that supports the transmission 13, and the remaining portions of the tiller 10, above the ground surface. The two spaced-apart wheels 95 are preferably sized and shaped to movably support the tiller 10 on the ground surface. An opposing second or outer end 94b of one of the tubes 94, which is preferably rotatable with respect to a first outer end plate 38a, preferably includes a first gear 37a fixedly attached thereto. The second end 94b of the other tube 94 is rotatably attached to an extension 96 of a second outer end plate 38b, such that the tube 94 is rotatable with respect to, but supported by, the second outer end plate 38b.

As shown in FIGS. 17A and 17B, it is preferred that one or more drivingly connected gears 37b, 37c, 37d, which are rotatably attached to extensions 96b, 96c, 96d, respectively, fixedly attached to an interior surface of the first outer end plate 38a, rotatably engage the first gear 37a. Thus, rotation of the first gear 37a rotates the one or more additional gears 37b, 37c, 37d. The last gear 37d (i.e., the additional gear 37d) is preferably fixedly attached to a least a portion of the brush 36, such that rotation of the last gear 37d rotates the brush 36. Thus, the combination of gears 37a, 37b, 37c, 37d preferably transfers rotational movement or motion from the tine shaft 15 to the brush 36. The present invention is not limited to the above-described and shown number, size, type or orientation of gears 37a, 37b, 37c, 37d, as the above-identified characteristics could be modified to accomplish the desired functions. In other words, the brush 94 is operatively connected to at least one and preferably both tubes 94 such that rotation of the tube(s) 94 rotates the brush 36 for dispersing at least one of snow, dirt and dust.

FIGS. 18-18B show a preferred embodiment of the reverse mechanism 110. FIG. 18 shows the reverse mechanism 110 in a first or disengaged position, wherein the tine shaft 15 is driven or rotated in a forward direction (i.e., counterclockwise). FIG. 18A shows the reverse mechanism 110 in a second or neutral position, wherein the tine shaft 15 is not operatively engaged with or driven by the power unit 14. FIG. 18B shows the reverse mechanism 110 in a third or engaged position, wherein the tine shaft 15 is driven or rotated in a reverse direction (i.e., clockwise). The reverse mechanism 110 preferably includes a drive shaft 111 that is operatively connected to the power unit 14, such that the power unit 14 drives or rotates the drive shaft 111 through the transmission 13 in preferably one rotational direction (i.e., clockwise). The drive shaft 111 is preferably at least partially surrounded by the housing 16.

The drive shaft 111 is preferably a double-direction worm, meaning that the worm drive shaft 111 includes a first set of threads 111a on an exterior surface thereof that are generally angled with respect to and spaced-apart from a second set of threads 111b on an exterior surface thereof. In the present embodiment, the first set of threads 111a is considered the "forward" set and the second set of threads 111b is considered the "reverse" set. In the present embodiment, the first set of threads 111a are angled at approximately a ninety degree angle with respect to the second set of threads 111b. The shape and/or configuration of the threads 111a, 111b is not limited to the generally curved orientation shown in FIG. 18-18B, but instead may be generally straight or linear, for example.

Further, the reverse mechanism 110 preferably includes a first or forward gear 112, a second or tine gear 113 and a third or reverse gear 114. Each gear 112, 113, 114 is preferably supported at least partially, if not entirely, within the housing 16. The forward and reverse gears 112, 114 each preferably include a series of teeth on an outer periphery thereof that are sized and shaped to continuously and constantly engage a series of teeth on an outer periphery of the tine gear 113. The tine gear 113 is preferably directly supported by and rotatably mounted to an internal portion of the housing 16 of the transmission 13. The tine gear 113 is preferably fixedly attached to the tine shaft 15, such that rotation of the tine gear 113 rotates the tine shaft 15. The forward and reverse gears 112, 114 are preferably directly supported by and rotatably mounted to a member or plate 115 (portions of which are shown in solid and phantom lines in FIGS. 18-18B). The plate 115 is preferably directly supported by and/or within, and movably mounted, such as rotatably or pivotally, to an internal portion of the housing 16 of the transmission 13. Thus, movement or rotation of the plate 115 preferably moves the forward and reverse gears 112, 114 toward and in contact with, or away and out of contact with, the worm drive shaft 111.

The cable 24 is preferably operatively or directly attached to the forward gear 112. Alternatively, the cable 24 may be directly attached to the plate 115, for example. A grommet seal 117, which may be located where the cable 24 enters the housing 16 of the transmission 13, preferably prevents dirt and debris, for example, from entering the interior of the housing 16. The lever operatively connected to the cable 24, as described above, preferably allows a user to selectively engage or disengage the reverse mechanism 110. At least a portion of the reverse gear 114 is preferably directly attached to an internal portion of the housing 16 of the transmission 13 by a biasing member or spring 116, such as a tension coil spring. Alternatively, the spring 116 may directly attach a portion of the plate 115 to an internal portion of the housing 16. The spring 116 preferably biases the reverse mechanism 110 in the disengaged position when the lever or reverse mechanism 110 is not selectively engaged by the user, such that the reverse gear 114 is not in contact with the worm drive shaft 111 and the tine shaft 15 is not rotated in the reverse direction.

In operation, the reverse mechanism 110 is preferably normally biased to the disengaged position or forward configuration shown in FIG. 18. More specifically, unless the lever is selectively moved or manipulated by the user in a predetermined fashion or into a predetermined position, the forward gear 112 engages both the worm drive shaft 111 and the tine gear 113 to rotate the tine shaft(s) 15 in a forward direction when the power unit 14 is energized or "on." In this configuration, the reverse gear 114 is not driven and simply acts as an idle gear. However, when the user or operator desires to reverse the rotation of the tine plates 18, the operator preferably selectively manipulates or moves the lever in a predetermined fashion, which causes the cable 24 to disengage (i.e., pull) the forward gear 112 away from and out of engagement with the worm drive shaft 111. Once the forward gear 112 is disengaged from the worm drive gear 111, the reverse mechanism 110 is preferably in the neutral position or configuration as shown in FIG. 18A at least momentarily, because neither the forward or reverse gears 112, 114 are engaged with or driven by the worm drive shaft 111. Thus, in the neutral position of the reverse mechanism 110, neither the tine gear 113 nor the tine shaft 115 is driven. Conventional mini-tillers do not include a neutral position.

To reverse the rotation of the tines 18, the lever is either held in the above-described predetermined position or manipulated or moved to another predetermined position, which causes the cable 24 to continue to move the forward gear 112 away from the worm drive gear 111 and move the reverse gear 114 into contact or engagement with the worm drive gear 111, as shown in FIG. 18B. In the reverse or third configuration shown in FIG. 18B, rotation of the worm drive gear 111 rotates the tine gear 113 in the reverse direction, which in turn rotates the tine plates 18 in the reverse direction. In this configuration, the forward gear 112 is not driven and simply acts as an idle gear. The reverse mechanism 110 is not limited to operation with the tine plates 18, as the reverse mechanism 110 may reverse the rotation of the brush 35 or any other attachment of the tiller 10. The reverse mechanism 110 of the present invention eliminates the requirement of conventional tillers for the user to leave the operating position and manually reposition or relocate gears to reverse operation of the tines. In addition, the reverse mechanism 110 of the present invention eliminates the need for a slot in the body of a conventional tiller that allows dirt and debris, for example, to enter the internal components of the tiller 10 and negatively affect operation thereof.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

We claim:

1. A device for cultivating soil or brushing debris comprising:
  a frame supporting a transmission and a motor, the transmission defining a housing;
  a shaft rotatably supported by the housing and being driven by the motor through the transmission, a distal end of the shaft spaced-apart from the housing having a passageway therethrough, wherein the distal end of the shaft has a flattened surface;
  at least one fastener sized and shaped to be at least partially received within the passageway of the shaft; and
  an attachment selected from the group consisting of a tine assembly and a brush attachment removably attachable to the shaft by the fastener, wherein the tine assembly and the brush attachment are interchangeable on the distal end of the shaft;
  the tine assembly including a first pair of two laterally spaced-apart tine disks, each tine disk including at least one blade for directly engaging and cultivating soil, the first pair of tine disks being laterally positioned on the shaft between the fastener and the housing, wherein the tine disks receive the flattened surface of the distal end of the shaft such that an engagement between the tine disk and the flattened surface acts as a locking key;
  the brush attachment including a tube and a wheel rotatably attached to a first end thereof and a first gear fixedly attached to an opposing second end thereof, at least a portion of the at least one fastener extending through at least a portion of the tube to fixedly attach the tube to the shaft.

2. The device according to claim 1 wherein the shaft extends completely through the housing and extends generally perpendicular to a longitudinal axis of the housing, each opposing end of the shaft including a passageway therethrough.

3. The device according to claim 1 wherein the shaft includes a first shaft extending outwardly from one side of the housing and a second shaft extending outwardly from an opposing side of the housing, each of the first and second shafts being driven by the motor and a distal end of each of the first and second shafts including a passageway therethrough.

4. The device according to claim 1 wherein the tine assembly includes a second pair of two laterally spaced-apart tine disks, the first pair of tine disks being connected to the second pair of tine disks by at least one connector rod, the at least one connector rod being inserted through an aperture in a portion of each tine disk and extending generally parallel to the shaft.

5. The device according to claim 4 further comprising a sheath surrounding the at least one connector rod and maintaining a predetermined distance between the first and second pairs of tine disks.

6. The device according to claim 4 further comprising a nut removably attachable to a distal end of the connector rod to secure the second pair of tine disks to the first pair of tine disks.

7. The device according to claim 4 further comprising:
  a connector piece having three connector rods held in a spaced-apart relation by a plate extending generally perpendicular to a longitudinal axis of each of the three connector rods; and
  a support shaft extending from at least one side of the plate and generally parallel to each of the three connector rods, the support shaft including a passageway on a distal end thereof for receiving at least a portion of a second fastener.

8. The device according to claim 4 further comprising a connector piece having three spaced-apart connector rods, each connector rod including a first end having one of threads and a passageway therethrough and an opposite second end having a passageway therethrough.

9. The device according to claim 4 further comprising a connector piece having three connector rods extending laterally outwardly from each side of a plate, wherein the connector rods are spaced-apart such that no two connector rods on opposing sides of the plate define a single longitudinal axis.

10. The device according to claim 1 further comprising:
  a shield attached to a portion of the housing, the shield separating the motor from the at least one tine assembly, the shield including a central portion, a first extension and a second extension, at least one of the first and second extensions being selectively movably with respect to the central portion so as to move from a retracted position to an expanded position.

11. The device according to claim 1 further comprising:
  a brush operatively connected to the tube such that rotation of the tube rotates the brush for dispersing at least one of snow, dirt and dust.

12. The device according to claim 11 further comprising:
  an outer end plate rotatably attached to the second end of the tube; and an additional gear rotatably attached to and supported by the outer end plate, the additional gear rotatably engaging the first gear and fixedly attached to the brush.

13. The brush attachment according to claim 1 wherein the fastener extending through at least a portion of the tube is at least partially received within the passageway of the shaft, thereby fixedly attaching the tube to the shaft.

* * * * *